(12) United States Patent
Watts et al.

(10) Patent No.: US 7,961,088 B2
(45) Date of Patent: Jun. 14, 2011

(54) ASSET MONITORING SYSTEM AND PORTABLE SECURITY SYSTEM THEREFOR

(75) Inventors: Fred S. Watts, New Freedom, PA (US); Francis J. Rosenthal, Street, MD (US); Maureen Silber, Baltimore, MD (US)

(73) Assignee: Cattail Technologies, Inc., Towson, MD (US)

( * ) Notice: Subject to any disclaimer, the term of this patent is extended or adjusted under 35 U.S.C. 154(b) by 887 days.

(21) Appl. No.: 11/840,436

(22) Filed: Aug. 17, 2007

(65) Prior Publication Data
US 2008/0042809 A1 Feb. 21, 2008

Related U.S. Application Data

(60) Provisional application No. 60/838,910, filed on Aug. 18, 2006.

(51) Int. Cl.
*G08B 29/00* (2006.01)
(52) U.S. Cl. ............. 340/506; 340/517; 340/539.1; 340/539.22; 340/545.1; 340/686.6
(58) Field of Classification Search .......... 340/539.13, 340/506
See application file for complete search history.

(56) References Cited

U.S. PATENT DOCUMENTS

| | | | | |
|---|---|---|---|---|
| 4,742,336 A | * | 5/1988 | Hall et al. | 340/539.11 |
| 5,200,735 A | * | 4/1993 | Hines | 340/539.11 |
| 5,587,701 A | | 12/1996 | Hess | |
| D379,157 S | | 5/1997 | Hess | |
| 5,731,757 A | | 3/1998 | Layson, Jr. | |
| 5,748,083 A | * | 5/1998 | Rietkerk | 340/568.2 |
| 5,777,551 A | | 7/1998 | Hess | |
| 5,836,002 A | * | 11/1998 | Morstein et al. | 340/568.1 |
| 5,850,180 A | | 12/1998 | Hess | |
| 6,049,273 A | | 4/2000 | Hess | |
| 6,072,250 A | | 6/2000 | Thandiwe et al. | |
| 6,075,451 A | | 6/2000 | Lebowitz et al. | |
| 6,356,192 B1 | | 3/2002 | Menard et al. | |
| 6,441,731 B1 | | 8/2002 | Hess | |
| 6,611,686 B1 | | 8/2003 | Smith et al. | |
| 6,759,956 B2 | | 7/2004 | Menard et al. | |
| 6,831,557 B1 | | 12/2004 | Hess | |
| 6,864,789 B2 | * | 3/2005 | Wolfe | 340/539.1 |
| 6,960,998 B2 | | 11/2005 | Menard et al. | |
| 2002/0113704 A1 | | 8/2002 | Hess | |
| 2003/0061344 A1 | | 3/2003 | Monroe | |
| 2004/0036598 A1 | | 2/2004 | Rolf et al. | |
| 2004/0061611 A1 | | 4/2004 | Rolf et al. | |

(Continued)

*Primary Examiner* — Davetta W Goins
*Assistant Examiner* — John F Mortell
(74) *Attorney, Agent, or Firm* — Harness, Dickey & Pierce, P.L.C.

(57) ABSTRACT

A portable security system for monitoring an asset has one or more alarm sensors and a wireless transmitter/receiver that communicates via wireless communication with a host system. The portable security system is switchable between a disabled (partially powered) state and an enabled (fully powered state) in response to commands received from the host system. In an aspect, the portable security system has a plurality of alarm sensors which a user can separately activate and deactivate via the host system. In an aspect, the portable security system includes a base unit and an auxiliary unit. The base unit includes one or more of the alarm sensors that serves a dual purpose depending on whether the base unit is mated with the auxiliary unit. In an aspect, the host system can be utilized by multiple users to manage portable security systems associated with the respective users, including management by group. In an aspect, the host system notifies a user(s) of an alarm condition(s).

26 Claims, 27 Drawing Sheets

U.S. PATENT DOCUMENTS

| | | |
|---|---|---|
| 2004/0100379 A1 | 5/2004 | Boman et al. |
| 2005/0030174 A1 | 2/2005 | Hess |
| 2005/0030175 A1 | 2/2005 | Wolfe |
| 2005/0046567 A1 | 3/2005 | Mortenson et al. |
| 2005/0080566 A1 | 4/2005 | Vock et al. |
| 2005/0174235 A1 | 8/2005 | Davis et al. |
| 2005/0179539 A1 | 8/2005 | Hill et al. |
| 2005/0179541 A1 | 8/2005 | Wolfe |

* cited by examiner

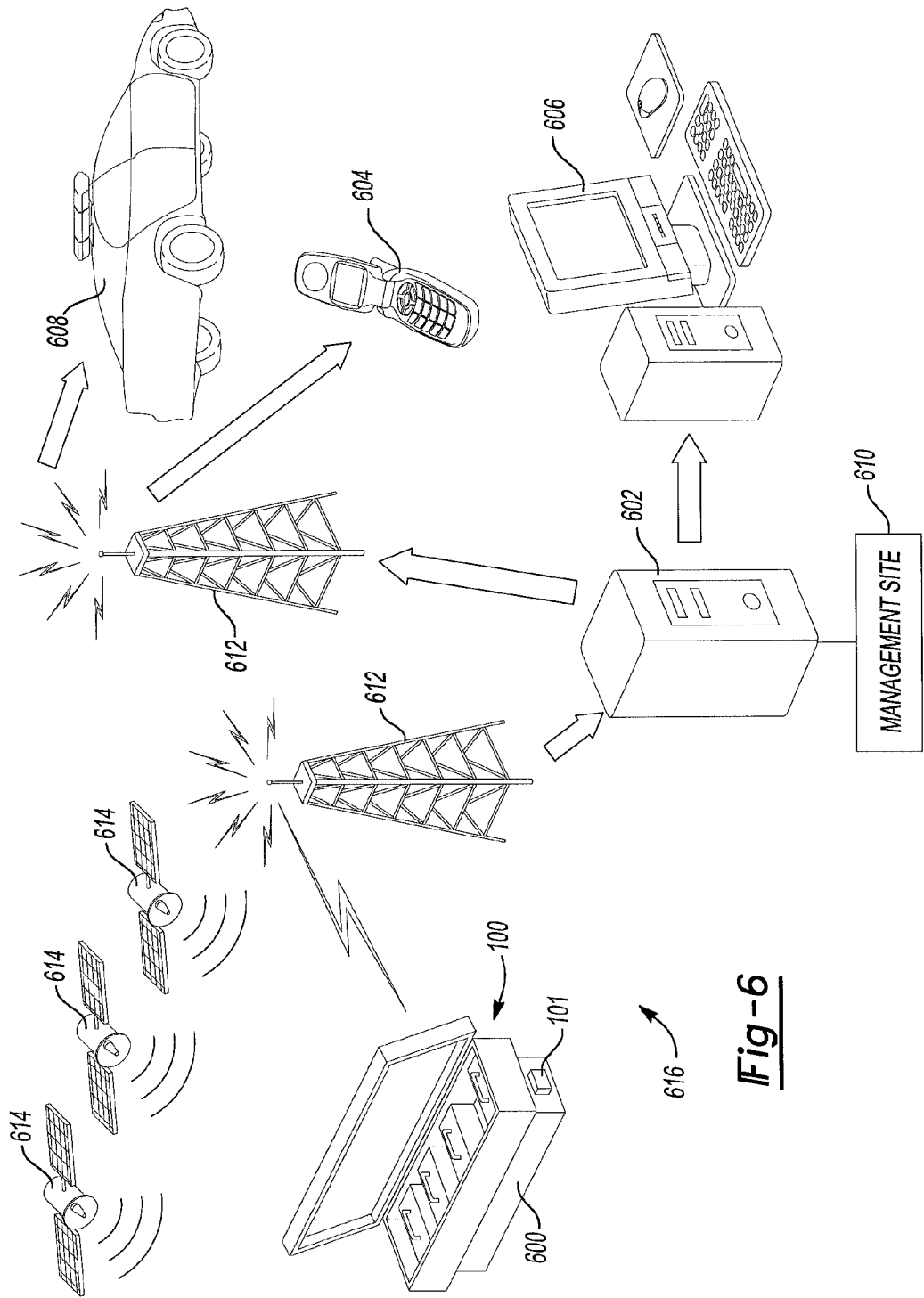

| UNITS | Units - Account Summary | | | | 1000 | |
|---|---|---|---|---|---|---|
| Account Summary | | | | | | |
| Customize Units | | | | | | |
| Update Alarm Contacts | | | | | | |
| Location History | All Units | | | | | |
| Arm Schedule | | | | | | |
| Add a New Unit | Unit Name: Storage Box ✆ | DISARMED | Arm | Locate (190) | Request Status | Settings |
| USERS | Unit Number: 00506561837 | | | | | |
| Maintain Users | | | | | | |
| User Profile | Unit Name: Tractor ✆ | DISARMED | Arm | Locate (190) | Request Status | Settings |
| ACCOUNTS | Unit Number: 00506561806 | | | | | |
| Account Billing Info | | | | | | |
| Purchase Locates | Unit Name: Office Trailer ✆ | DISARMED | Arm | Locate (190) | Request Status | Settings |
| GROUPS | Unit Number: 00506566652 | | | | | |
| Group Management | | | | | | |
| Customize Group | | | | | | |
| Group Schedule | | | | | | |
| REPORTS | | | | | | |
| Event History | | | | | | |

Fig-10A

| UNITS |
|---|
| Account Summary |
| Customize Units |
| Update Alarm Contacts |
| Location History |
| Arm Schedule |
| Add a New Unit |
| USERS |
| Maintain Users |
| User Profile |
| ACCOUNTS |
| Account Billing Info |
| Purchase Locates |
| GROUPS |
| Group Management |
| Customize Group |
| Group Schedule |
| REPORTS |
| Event History |

Units - User Profile   1002

E-mail Address (website login):  [ ]
Phone Menu Login:  [ ]
Password (4-8 digits, numeric):  [ ]
Verify Password:  [ ]
Temperature Scale:  [ Farenheit ▽ ]
Unit Display:  [ Names ▽ ]
Timezone:  [ Eastern ▽ ]
Daylight Saving Time:  [▷]

[ Submit Changes ]

Fig-10B

| | | Unit Settings | |
|---|---|---|---|
| Customize Units | | | |
| Update AlarmContacts | Select Your Unit | Sensors (help) | |
| Location History | Office Trailer ▽ | ☐ Motion Detector ☐ Low Temperature: ☐ F | |
| Arm Schudule | change unit name | ☐ Door Contact ☐ High Temperature: ☐ F | |
| Add a New Unit | Status: Unit is DISARMED | ☐ Tamper ☐ Vibration | |
| USERS | Modify Arming Schedule? | Sensitivity: 1 - Low ▽ | |
| Maintain Users | ┌─ Send Unit Commands ─┐ | False Alarm Filter: None - Off ▽ | |
| User Profile | 1012 ─ [ Arm ] [ Disarm ] ─ 1014 | Submit Senesor Changes | |
| ACCOUNTS | 1018 ─ [ Locate (190) ] [ Page ] ─ 1016 | ☑ Power Connected / Lost | |
| Account Billing Info | 1010 ─ [ Request Status ] [ Test Unit ] ─ 1019 | ☑ Arm / Disarm | |
| Purchase Locates | | Submit Speaker Changes | |
| GROUPS | [ Purchase Locates ] | | |
| Group Management | | | |
| Customize Group | | | 1008 |
| Group Schedule | | | |
| REPORTS | Unit History (ESN: 00506566652; Unit: Office Trailer) | | |
| Event History | 20 ▽ [ Next >>> ] | | |
| ADMIN | Event ID Operation Status Date | | |
| Suggestion Box | 77503 Disarm Request Success 06/06/2007 04:54 PM EDT | | |
| | 69197 Unit Status Request Success 05/21/2007 08:14 AM EDT | | |
| | 52558 Status (View) Success 04/12/2007 06:49 PM EDT | | |
| | 69197 Unit Status Request Success 04/12/2007 06:49 PM EDT | | |

Fig-10D

| | |
|---|---|
| UNITS | Units - Add a New Unit |
| Account Summary | |
| Customize Units | |
| Update Alarm Contacts | Electronic Serial Number (where?) |
| Location History | |
| Arm Schedule | |
| Add a New Unit | |
| USERS | Add More   Submit |
| Maintain Users | |
| User Profile | 1020 |
| ACCOUNTS | |
| Account Billing Info | |
| Purchase Locates | |
| GROUPS | |
| Group Management | |
| Customize Group | |
| Group Schedule | |
| REPORTS | |
| Event History | |

Fig-10E

| | |
|---|---|
| UNITS | Name Unit |
| Account Summary | |
| Customize Units | |
| Update Alarm Contacts | Select Unit: [Office Trailer ▽] |
| Location History | |
| Arm Schedule | ESN: 00506566652 |
| Add a New Unit | |
| USERS | New Nickname: [Office Trailer] |
| Maintain Users | |
| User Profile | [Submit Changes] |
| ACCOUNTS | |
| Account Billing Info | |
| Purchase Locates | |
| GROUPS | |
| Group Management | |
| Customize Group | |
| Group Schedule | |
| REPORTS | |
| Event History | |

| Customize Units | |
|---|---|
| Update AlarmContacts | |
| Location History | Select Unit: [Office Trailer ▽]     1026 |
| Arm Schedule | ESN: 00506-566652; Unit: Ofice Trailer |
| Add a New Unit | |
| USERS | |
| Maintain Users | |
| User Profile | |
| ACCOUNTS | |
| Account Billing Info | |
| Purchase Locates | |
| GROUPS | |
| Group Management | |
| Customize Group | |
| Group Schedule | |
| REPORTS | |
| Event History | |
| ADMIN | |
| Suggestion Box | |

| Day | Disarm (hhmm) | Arm (hhmm) |
|---|---|---|
| Weekdays (Monday-Friday) | [hh ▽] [mm ▽] [Select ▽] | [hh ▽] [mm ▽] [Select ▽] |
| Sunday | [hh ▽] [mm ▽] [Select ▽] | [hh ▽] [mm ▽] [Select ▽] |
| Monday | [hh ▽] [mm ▽] [Select ▽] | [hh ▽] [mm ▽] [Select ▽] |
| Tuesday | [hh ▽] [mm ▽] [Select ▽] | [hh ▽] [mm ▽] [Select ▽] |
| Wednesday | [hh ▽] [mm ▽] [Select ▽] | [hh ▽] [mm ▽] [Select ▽] |
| Thursday | [hh ▽] [mm ▽] [Select ▽] | [hh ▽] [mm ▽] [Select ▽] |
| Friday | [hh ▽] [mm ▽] [Select ▽] | [hh ▽] [mm ▽] [Select ▽] |
| Saturday | [hh ▽] [mm ▽] [Select ▽] | [hh ▽] [mm ▽] [Select ▽] |

[Clear Scheduled Events]     [Update]

*Fig-10H*

| | |
|---|---|
| UNITS | Users - Maintain Users |
| Account Summary | |
| Customize Units | --Selece a User-- ▽ |
| Update Alarm Contacts | |
| Location History | Login: [          ] |
| Arm Schedule | |
| Add a New Unit | Password: [          ] |
| USERS | |
| Maintain Users | Confirm Password: [          ] |
| User Profile | |
| ACCOUNTS | Phone Menu Login: [   ][   ][   ] |
| Account Billing Info | |
| Purchase Locates | Role: --Selece a Role-- ▽ |
| GROUPS | |
| Group Management | [ Clear Form ] [ Submit Changes ] |
| Customize Group | |
| Group Schedule | |
| REPORTS | |
| Event History | |

| | |
|---|---|
| UNITS | |
| Account Summary | |
| Customize Units | |
| Update Alarm Contacts | |
| Location History | |
| Arm Schedule | |
| Add a New Unit | |
| USERS | |
| Maintain Users | |
| User Profile | |
| ACCOUNTS | |
| Account Billing Info | |
| Purchase Locates | |
| GROUPS | |
| Group Management | |
| Customize Group | |
| Group Schedule | |
| REPORTS | |
| Event History | |

Account

--Select an Account-- ▽

Account Name*: [          ]

[ Add ]  [ Clear ]

Groups - Customize Group

Unit Settings 1038

Select a Group [▽]

[Arm] [Disarm]

Sensors (help)
- ☐ Motion Detector  ☐ Low Temperature:  [ ] F
- ☐ Door Contact  ☐ High Temperature:  [ ] F
- ☐ Tamper  ☐ Vibration Sensitivity: [1 - Low ▽]
- False Alarm Filter: [None - Off ▽]

[Submit Changes]

Speaker (help)
- ☐ All Changes  ☐ Power Connected / Lost
- ☐ Alarm Siren  ☐ Arm / Disarm

[Submit Changes]

UNITS
Account Summary
Customize Units
Update Alarm Contacts
Location History
Arm Schedule
Add a New Unit USERS
Maintain Users
User Profile ACCOUNTS
Account Billing Info
Purchase Locates GROUPS
Group Management
Customize Group
Group Schedule REPORTS
Event History

Sidebar menu:
- Customize Units
- Update AlarmContacts
- Location History
- Arm Schedule
- Add a New Unit

USERS
- Maintain Users
- User Profile

ACCOUNTS
- Account Billing Info
- Purchase Locates

GROUPS
- Group Management
- Customize Group
- Group Schedule

REPORTS
- Event History

ADMIN
- Suggestion Box

---

1040

Select Group: [--Select a Group-- ▽]
Viewing Group:

| Day | Disarm (hhmm) | | | Arm (hhmm) | | |
|---|---|---|---|---|---|---|
| Weekdays (Monday-Friday) | hh ▽ | mm ▽ | Select ▽ | hh ▽ | mm ▽ | Select ▽ |
| Sunday | hh ▽ | mm ▽ | Select ▽ | hh ▽ | mm ▽ | Select ▽ |
| Monday | hh ▽ | mm ▽ | Select ▽ | hh ▽ | mm ▽ | Select ▽ |
| Tuesday | hh ▽ | mm ▽ | Select ▽ | hh ▽ | mm ▽ | Select ▽ |
| Wednesday | hh ▽ | mm ▽ | Select ▽ | hh ▽ | mm ▽ | Select ▽ |
| Thursday | hh ▽ | mm ▽ | Select ▽ | hh ▽ | mm ▽ | Select ▽ |
| Friday | hh ▽ | mm ▽ | Select ▽ | hh ▽ | mm ▽ | Select ▽ |
| Saturday | hh ▽ | mm ▽ | Select ▽ | hh ▽ | mm ▽ | Select ▽ |

☐ CHECK: Add these changes to the current schedule for each unit
  UNCHECK: Clear current schedule for each unit and replace with this schedule

Reports - Event History

1042

| UNITS | Units: | Groups: | Dates: | Events: |
|---|---|---|---|---|
| Account Summary | --All Units-- | --All Groups-- | Begin: _____ Calendar | --All Events-- |
| Customize Units | Office Trailer | All Units | End: _____ Calendar | Activation Request |
| Update Alarm Contacts | Storage Box | | -OR- | Alarm |
| Location History | Tractor | | Recent: Days ▽ | Arm Request |
| Arm Schedule | | | Interval: 10 | Arm Response |
| Add a New Unit | | | | Async Locate |
| USERS | | | Search | Async Status Report |
| Maintain Users | | | | Auto Arm Event |
| User Profile | | | Export   Clear | Auto Disarm Event |
| ACCOUNTS | | | | |
| Account Billing Info | | | | |
| Purchase Locates | | | | |
| GROUPS | | | | |
| Group Management | | | | |
| Customize Group | | | | |
| Group Schedule | | | | |
| REPORTS | | | | |
| Event History | | | | |

*Fig-10O*

ASSET MONITORING SYSTEM AND PORTABLE SECURITY SYSTEM THEREFOR

CROSS-REFERENCE TO RELATED APPLICATIONS

This application claims the benefit of U.S. Provisional Application No. 60/838,910 filed on Aug. 18, 2006. The disclosure of the above application is incorporated herein by reference.

FIELD

The present disclosure relates to asset monitoring systems and portable security systems therefor.

SUMMARY

In an aspect, a portable security system has one or more alarm sensors and a wireless transceiver that communicates via wireless communication with a host system. The portable security system is switchable between a disabled (partially powered) state and an enabled (fully powered state) in response to commands received from the host system. In an aspect, the portable security system is shipped from a manufacturer in the disabled state and is enabled by the host system, such as in response to the user registering the portable security system with the host system and activating it via the host system. In an aspect, the wireless communication is cellular communication. In an aspect, the system is provisioned with parameters necessary for its operation prior to being shipped from the manufacturer in the disabled state.

In an aspect, the portable security system has a plurality of alarm sensors which a user can separately activate and deactivate via the host system. In an aspect, the user activates and deactivates each alarm sensor via a web interface with the host system.

In an aspect, the portable security system includes a base unit and an auxiliary unit. The base unit includes one or more of the alarm sensors including a window/door sensor that serves a dual purpose depending on whether the base unit is mated with the auxiliary unit. When the base unit is not mated with the auxiliary unit, the window/door sensor senses whether a window or door is opened. When the base unit is mated with the auxiliary unit, the window/door sensor senses whether the auxiliary unit is being tampered with, such as being removed from the base unit. In an aspect, the window/door sensor is a magnetic sensor and the auxiliary unit includes a housing having a receptacle in which the base unit is received. The housing includes a hinged cover having a magnet that is in proximity with the window/door sensor of the base unit when the hinged cover is closed. If the hinged cover is opened, the window/door sensor responds to the change in magnetic field caused by the magnet moving away from the window/door sensor and generates an alarm signal. The base unit then sends an alarm signal to the host system that the cover of the auxiliary unit has been opened and the host system notifies the user associated with that portable security system. In an aspect, the auxiliary unit is a battery pack.

In an aspect, the base unit includes a tamper sensor that provides a signal in response to the base unit being removed from a surface on which it is mounted. The base unit responds to this signal and sends a tamper alarm to the host system and then the host system notifies the user associated with that portable security system of the tamper condition. In an aspect, this surface is a surface of an asset being monitored by the portable security system. In an aspect, the base unit includes a window/door sensor, a vibration sensor and a temperature sensor.

In an aspect, the auxiliary unit includes an actuator for the tamper sensor so that the tamper sensor is operative when the base unit is mated in the auxiliary unit and the auxiliary unit is mounted on the surface. When the auxiliary unit is removed from the surface, the tamper sensor actuator in the auxiliary unit actuates the tamper sensor so that the tamper sensor generates the signal indicating that the auxiliary unit has been removed from the surface. In an aspect, the auxiliary unit may be a battery pack or a motion detector.

In an aspect, the host system can be utilized by multiple users to manage portable security systems associated with the respective users. In an aspect, each user can assign any of the portable security systems associated with that user to a group and also have multiple groups. The user can then configure as a group the portable security systems assigned to a group. The user configures the settings for the desired group which results in the settings for all the portable security systems assigned to that group being configured according to the group settings.

In an aspect, the host system notifies a user(s) of an alarm condition(s) by calling one or more contact number(s) designated by the user(s) during configuration of the portable security system(s), sending an e-mail to one or more e-mail address(es) designated by the user(s) during configuration of the portable security system(s), or both. In an aspect, the system does so sequentially by attempting to call each contact one at a time and calling the next contact if the first contact does not answer.

DRAWINGS

The drawings described herein are for illustration purposes only and are not intended to limit the scope of the present disclosure in any way.

FIG. 6 is a system diagram of an asset monitoring system with a portable security system;

DETAILED DESCRIPTION

Figure 1:
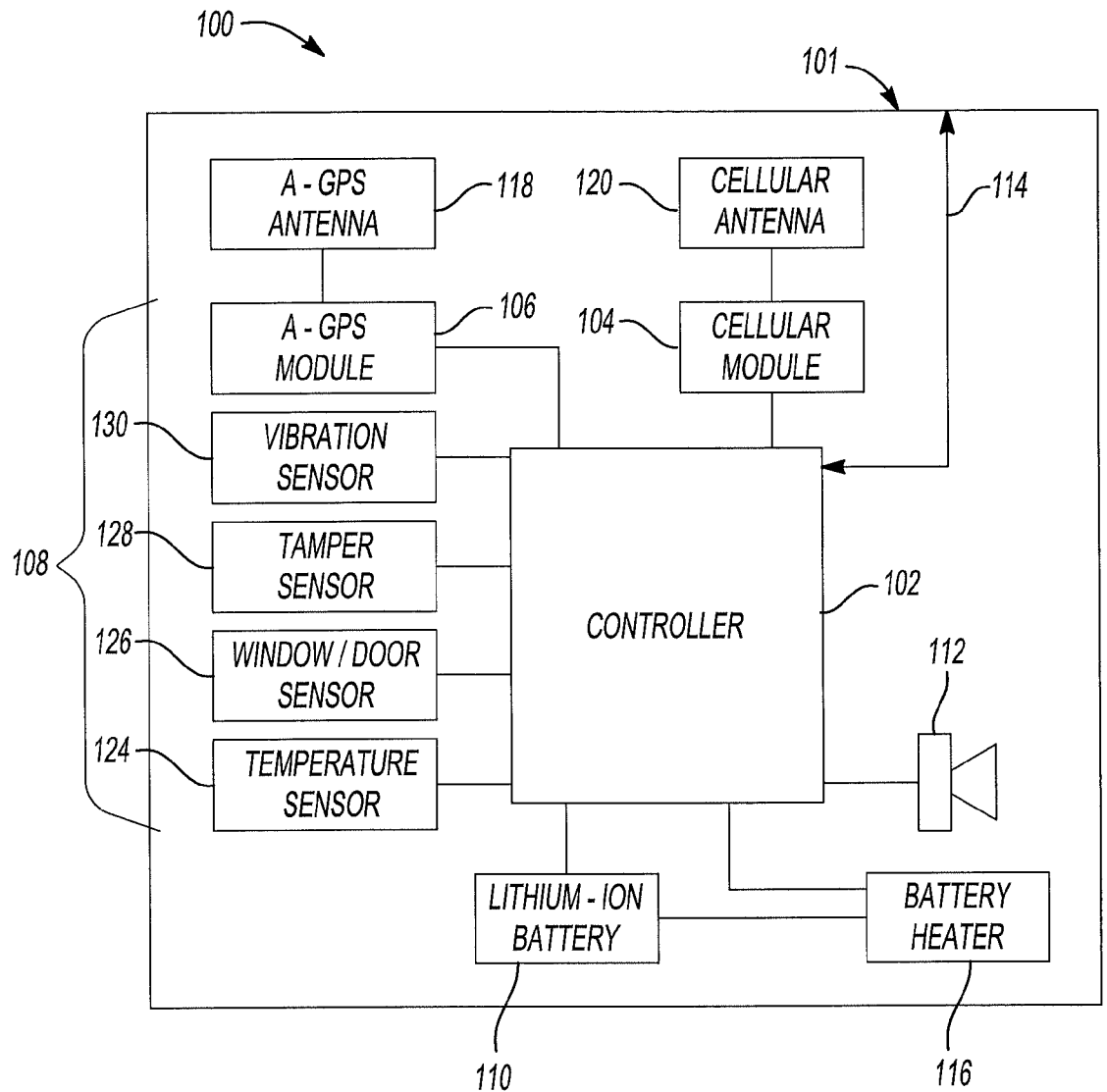
FIG. 1 is a block diagram of a base unit of a portable security system.

The following description is merely exemplary in nature and is not intended to limit the present disclosure, application, or uses. It should be understood that throughout the drawings, corresponding reference numerals indicate like or corresponding parts and features.

FIG. 1 is a block diagram of a portable security system 100 in accordance with an illustrative aspect. Portable security system 100 communicates via wireless communication with server(s) and communicates conditions, such as alarm conditions, to the server(s) and can be programmed by the server. The wireless communication used may illustratively be cellular communication. It should be understood that while the following description references cellular communication, other wireless communication may also be used, such as VHF, UHF, satellite, 802.11(b) (and similar communications). A user can interface with the server via the Internet or phone to manage portable security system 100 (e.g., configure it and to receive information from portable security system 100, such as alarms.)

Portable security system 100 includes a base unit 101. Base unit 101 includes a controller 102 coupled to a cellular module 104, a global positioning system (GPS) module 106, one or more sensors 108, battery 110, speaker 112 and an accessory port 114. In an illustrative embodiment, GPS module 106 is an assisted GPS module 106. In an illustrative aspect, battery 110 is a lithium ion battery and a battery heater 116 is coupled to battery 110 and controller 102. GPS module 106 is coupled to a GPS antenna 118 and cellular module 104 is coupled to cellular antenna 120. The foregoing components are disposed in a housing, such as housing 200 shown in FIGS. 2A and 2B. Sensor(s) 108 may include a temperature sensor (or sensors) 124, a window/door sensor (or sensors) 126, a tamper sensor (or sensors) 128, and a vibration sensor (or sensors) 130. It should be understood that sensor(s) 108 can include other types of sensors as well. For example, sensor(s) 108 can include water, light, RF, $CO_2$, magnetism, earth magnetic field (e.g., compass), gyroscopic, accelerometer, sensor mat, loss of charger power, vehicle buss communications (e.g., OBD-II), and the like.

Temperature sensor(s) 124 may illustratively be a thermistor, window/door sensor(s) 126 may illustratively be a magnetic sensor (such as a hall effect transducer or reed switch), tamper sensor(s) 128 may illustratively include a magnetic sensor and plunger assembly, as described below, and vibration sensor(s) 130 may illustratively be a cantilever-type vibration sensor, such as a Minisense 100 Vibration Sensor available from Measurement Specialties, Inc., 1000 Lucas Way, Hampton, Va. 23666. It should be understood that the sensors 124, 126, 128 and 130 may be types of sensors other than the foregoing types, and each of sensors 124, 126, 128 and 130 may be any sensor suitable for sensing the condition that the sensor is to sense. For example, window/door sensor 126 may illustratively be a magnetically actuated reed switch; and tamper sensor 128 may illustratively be a push button switch.

Figure 2A:
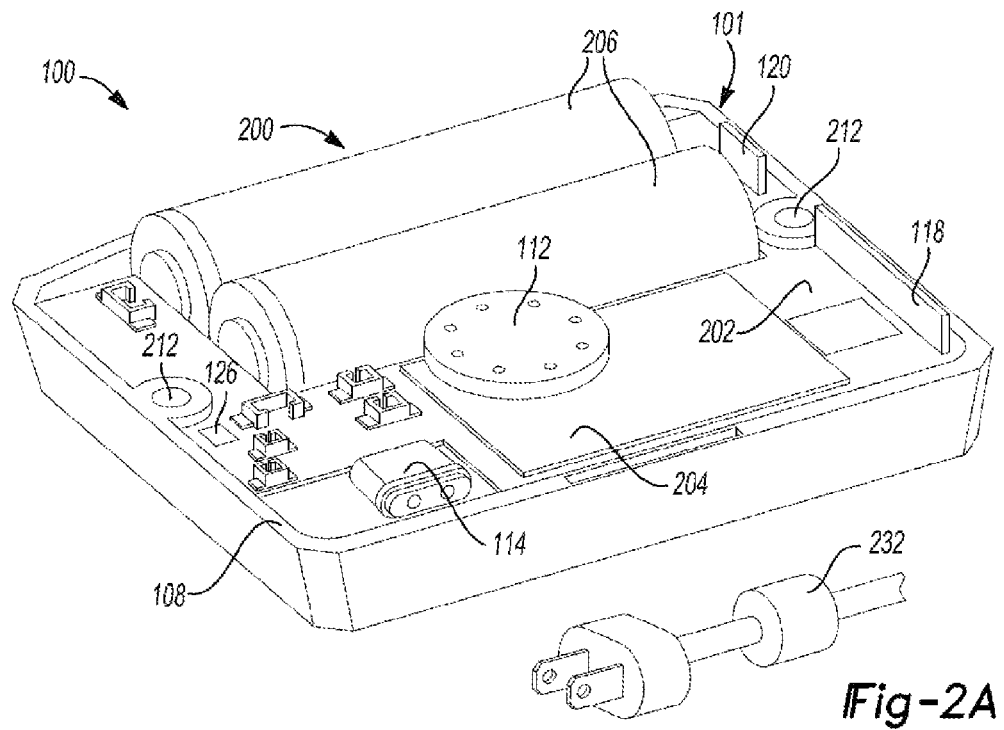
FIG. 2A is a top perspective view of the base unit of FIG. 1 with the top being transparent.
Figure 2B:
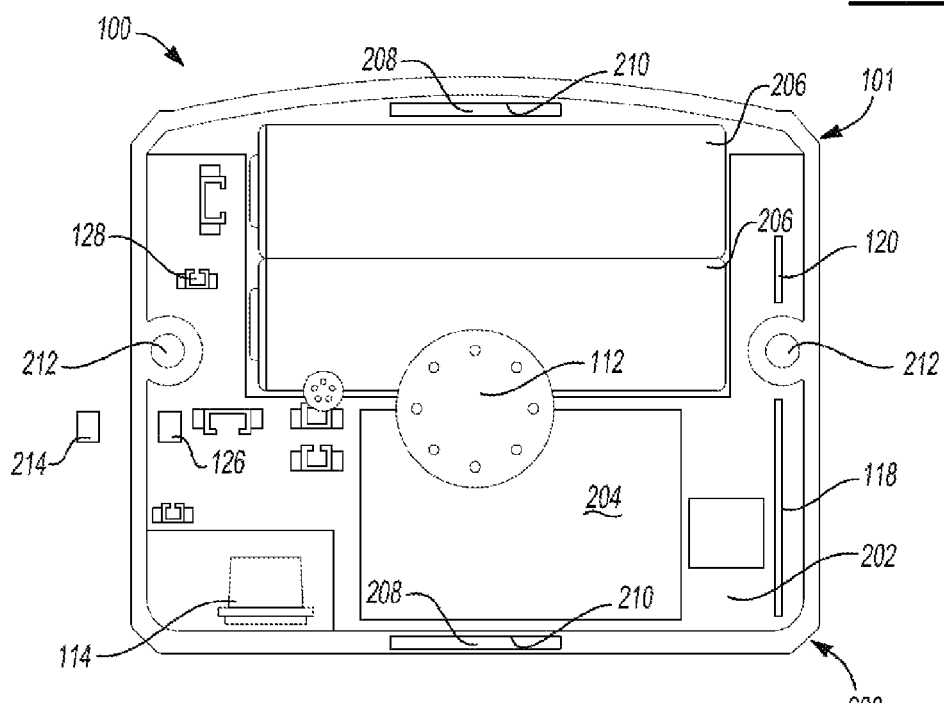
FIG. 2B is a top view of the base unit of FIG. 1.

FIGS. 2A and 2B show an illustrative embodiment of base unit 101 of portable security system 100. In the embodiment shown in FIGS. 2A and 2b, housing 200 has a small footprint, approximately the size of two decks of cards. Housing 200 may, for example, illustratively have a length of 111 mm, a width of 88 mm and a height of 32 mm. Base unit 101 can connect, such as via accessory port 114, with auxiliary devices, examples of which are discussed below, to provide additional capability for portable security system 100. Also, accessory port 114 provides connections for a conventional charger 232 (FIG. 2), which may be an A/C charger, DC charger, vehicle charger, solar charger, or other known type of charger that provides a requisite source of DC power to base unit 101.

A printed circuit board 202 is mounted within housing 200. Controller 102, cellular module 104, cellular antenna 120, GPS module 106, GPS antenna 118, accessory port 114, and associated electronic components are mounted on printed circuit board 202. An electromagnetic shield 204, such as a metal can, is mounted on printed circuit board 202 over RF circuits. Accessory port 114 may illustratively be a 7 pin mini-DIN connector. Battery 110 may illustratively be a lithium ion battery and in the embodiment shown in FIGS. 2A and 2B, illustratively includes two lithium ion battery cells 206. In the embodiment shown in FIGS. 2A and 2B, GPS antenna 118 and cellular antenna 120 are shown mounted vertically on printed circuit board 202. It should be understood that one or both of GPS antenna 118 and cellular antenna 120 can be mounted horizontally on or with respect to printed circuit board 202.

Speaker 112 is disposed in housing 200 and has lead wires (not shown) that connect to a connector on printed circuit board 202.

Housing 200 includes one or more features used to mount housing 200 on an asset to be protected or in an area to be protected or monitored. These mounting features may illustratively include one or more mounting magnets 208 disposed in housing 200. In the illustrative embodiment shown in FIGS. 2A and 2B, mounting magnets 208 are disposed in recesses 210 on opposite sides of housing 200 that illustratively open out of a bottom 300 (FIG. 3) of housing 200 with magnet(s) 208 flush, or virtually flush, with the bottom 300 of housing 200. These features may also, or alternatively, include one or more screw holes 212 in housing 200. In the illustrative embodiment shown in FIGS. 2A and 2B, housing 200 includes a screw hole 212 on each of the right and left sides (as oriented in FIGS. 2A and 2B) of housing 200.

In use, base unit 101 of portable security device 100 is mounted, such to an asset to be protected, using magnets 208 and/or screws (not shown) placed through screw hole(s) 212. For example, if base unit 101 is to be mounted on a metal tool box or metal tool cabinet, magnets 208 can be used to hold base unit 101 to the asset. If base unit 101 is to be mounted on a wood tool cabinet, screws can be inserted into screw holes 212 and tightened to affix base unit 101 to the asset. In some cases, base unit 101 can simply be placed on top of the asset, such as on the top surface of a tool box.

Figure 3:
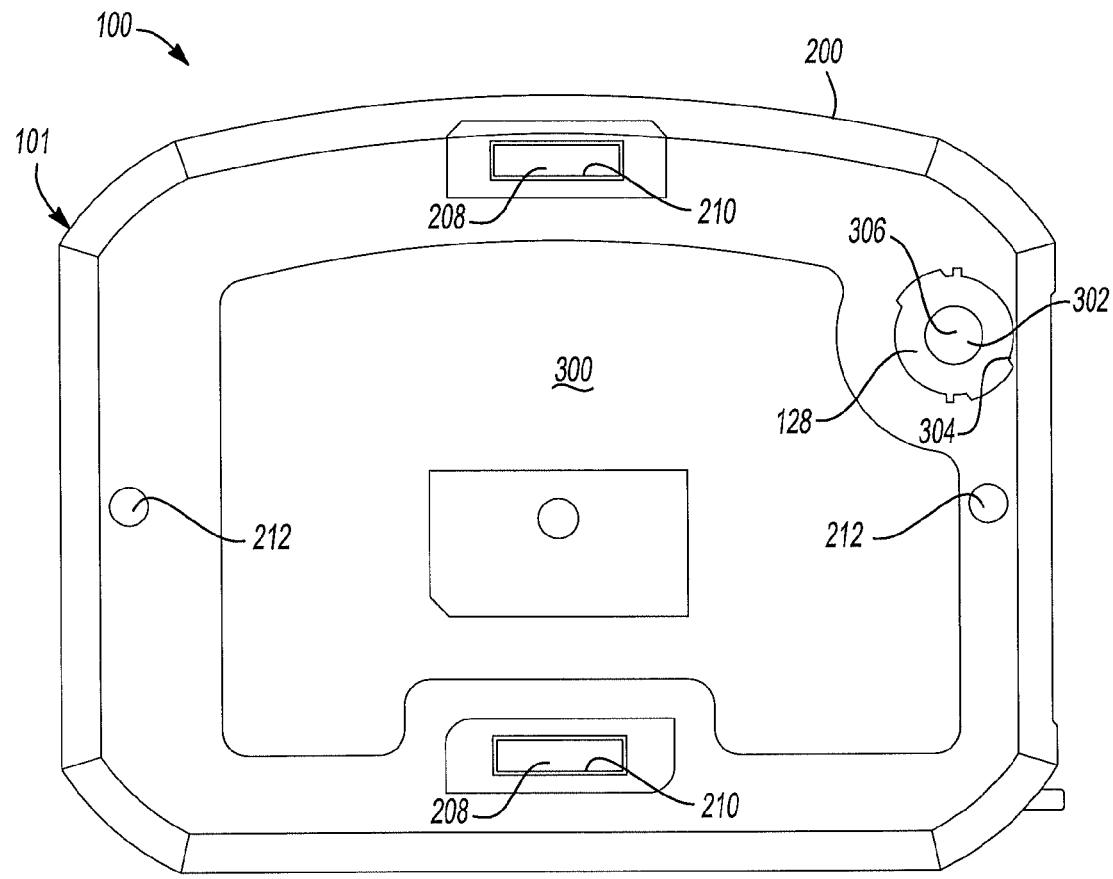
FIG. 3 is a bottom view of the base unit of FIG. 1.

In the illustrative embodiment shown in FIGS. 2A, 2B & 3, tamper sensor 128 includes a magnetic sensor, such as a hall effect transducer, mounted within housing 200, such as on printed circuit board 202, and a plunger or pin assembly 302 (FIG. 3) disposed in an outwardly opening recess 304 in bottom 300 of housing 200. Plunger or pin assembly 302 includes a pin or plunger 306, a compression spring and a magnet (not shown). The pin assembly 302 is disposed in housing 200 so that the pin 306 extends out of the bottom 300 of housing 200 when housing 200 is not mounted and is pushed up into housing 200 when housing 200 is mounted to an asset. If housing 200 is removed from the asset, the pin of the pin assembly springs out changing the location of the magnet with respect to the magnetic sensor and changing the magnetic field at the magnet sensor (i.e., bringing it closer to or further away). The change in magnetic field causes the magnetic sensor to provide a signal to controller 102 indicative of the plunger extending from the bottom 300 of housing 200. This causes controller 102 to determine that a tamper condition occurred, and it generates a tamper alarm as discussed in more detail below. Recess 304 is illustratively molded in an outer wall of housing 200 so that material of housing 200 is between pin assembly 302 and the inside of housing 200. This facilitates making housing 200 watertight without the need to provide a seal around pin assembly 302.

Figure 4A:
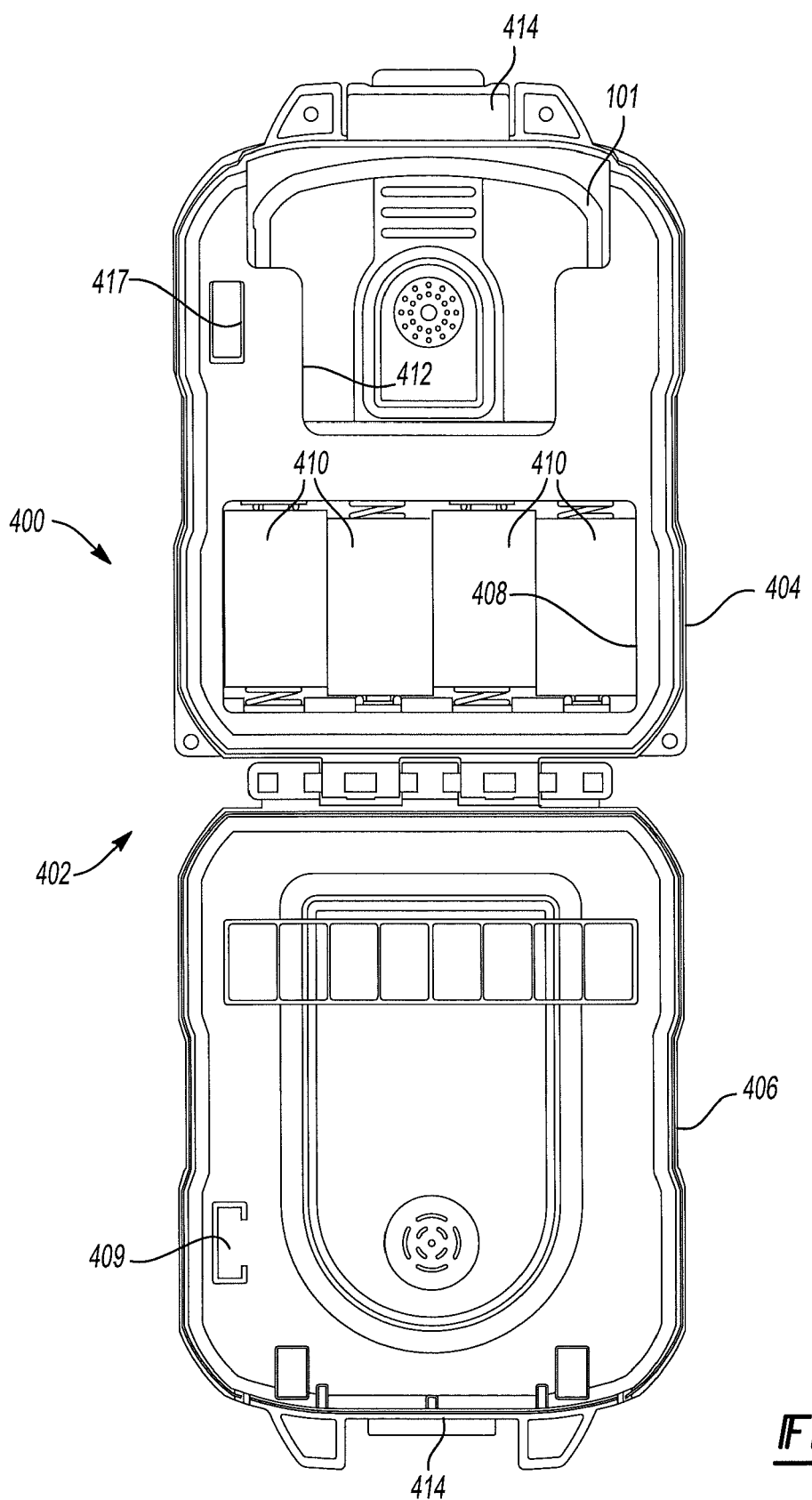
FIG. 4A is a top perspective view of an auxiliary battery unit in an open condition.
Figure 4B:
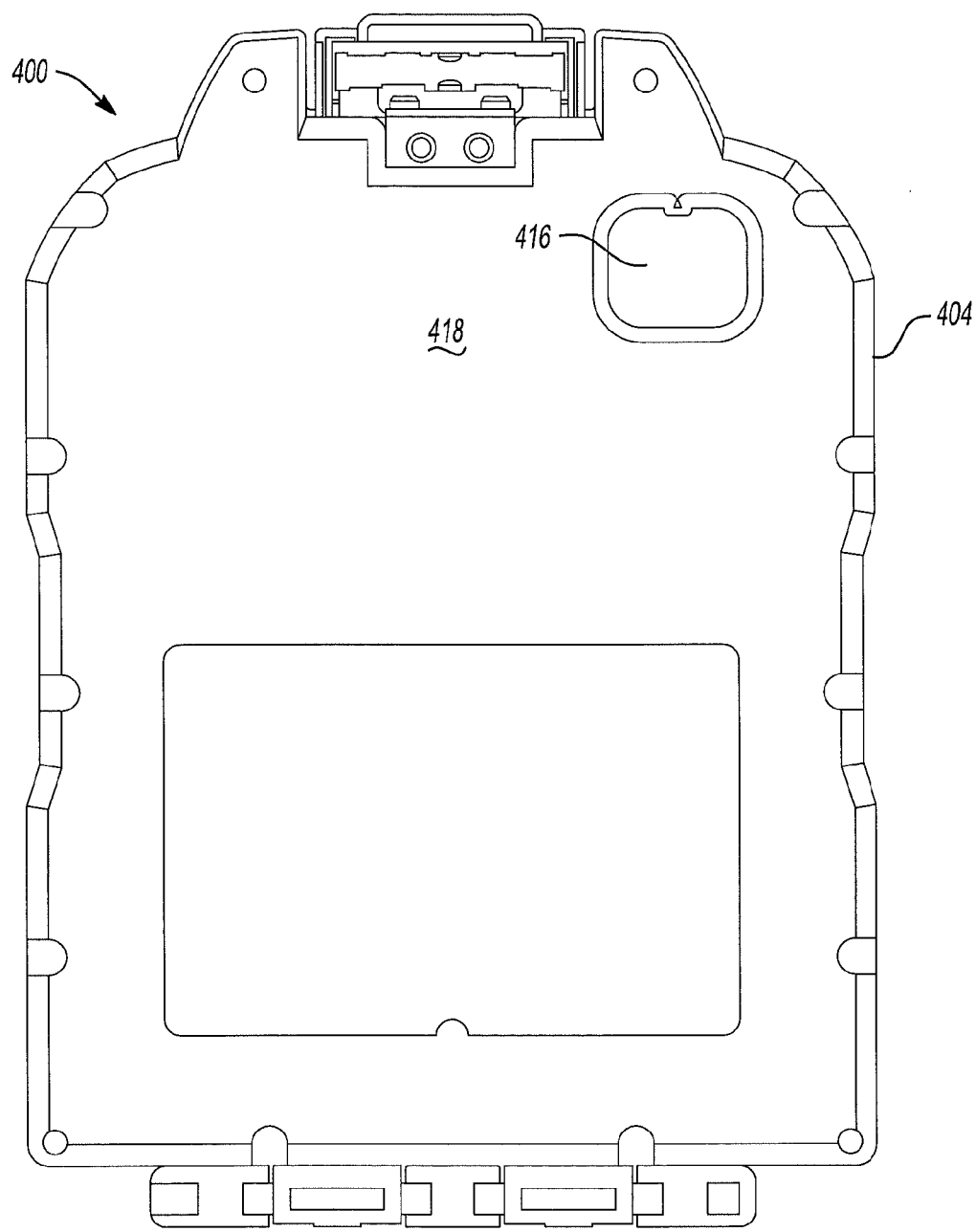
FIG. 4B is a bottom view of the auxiliary battery unit of FIG. 4A in a closed condition.
Figure 5A:
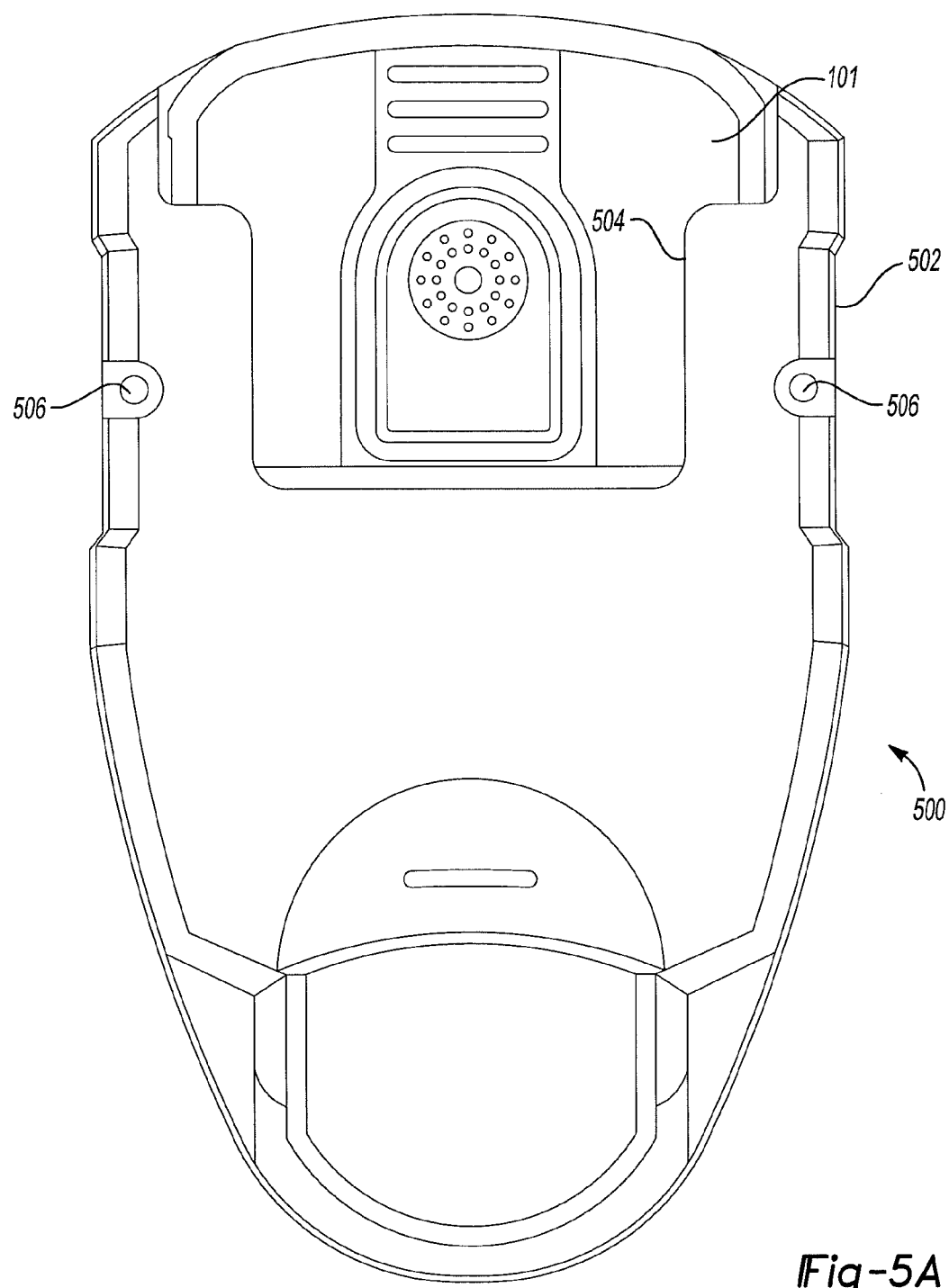
FIG. 5A is a top perspective view of an auxiliary motion detector unit.
Figure 5B:
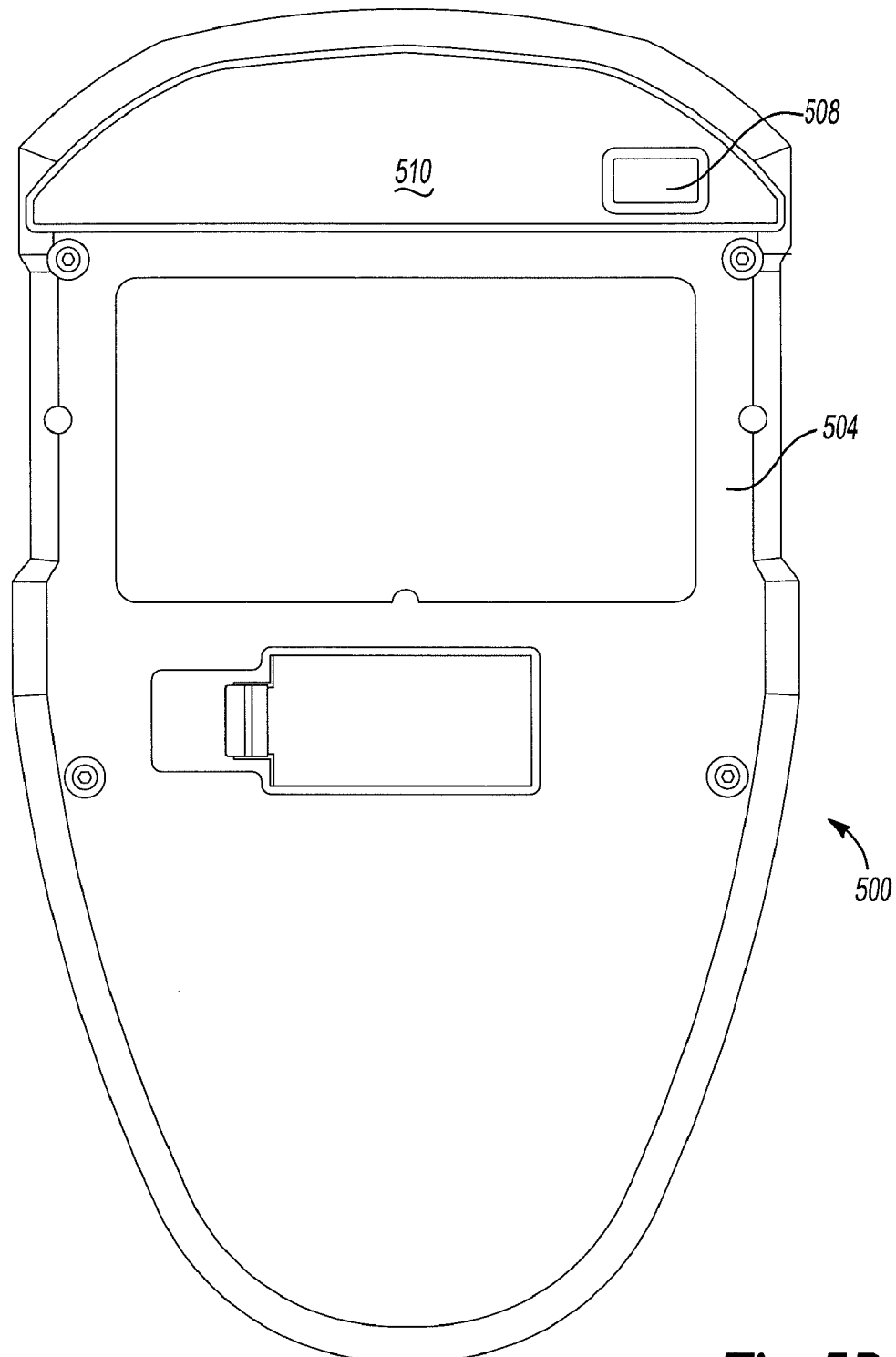
FIG. 5B is a bottom view of the auxiliary motion detector unit of FIG. 5A.

To provide portable security system 100 with additional functionality yet enable base unit 101 to remain small, base unit 101 is adapted to interface with accessory units, such as auxiliary battery unit 400 (FIGS. 4A and 4B) and motion detector 500 (FIGS. 5A and 5B). For example, with reference to FIGS. 4A and 4B, auxiliary battery unit 400 includes housing 402 having a base 404 and a hinged cover 406. Base 404 includes a battery compartment 408 in which battery cells 410, illustratively 4 D size alkaline battery cells, are received. Base 404 also includes a receptacle 412 for receiving base unit 101 and a connector (not shown) that mates with accessory port 114 of base unit 101 to electrically connect battery cells 410 to base unit 101. Base 404 and hinged cover 406 of housing 402 of auxiliary battery unit 400 including corresponding latch elements 414 that, when hinged cover 406 is closed over base 404 engage to latch hinged cover 406 to base 404 in a closed position. Base 404 of housing 402 also includes a movable pad 416 (FIG. 4B) disposed in a bottom 418 of housing base 404 that contacts pin 306 of pin assembly 302 of tamper sensor 128 when base unit 101 is disposed in receptacle 412 of base 404. Movable pad 416 provides an extension for pin 306 enabling tamper sensor 128 to work when base unit 101 is received in auxiliary battery unit 400. Movable pad 416 may illustratively be spring loaded.

With reference to FIGS. 5A and 5B, auxiliary motion detector unit 500 includes a housing 502 having a receptacle 504 for receiving base unit 101. Motion detector 500 may illustratively be a passive infrared radiation motion detector. Housing 502 may illustratively include screw holes 506 for mounting motion detector unit such as to a wall of a room to be monitored by tightening screws (not shown) inserted into screw holes 506 into the wall. Housing 502 includes a connector (not shown) that mates with accessory port 114 of base unit 101 to electrically connect motion detector unit 500 to base unit 101. In this aspect, motion detector unit 500 is physically electrically connected to base unit 101 through accessory port 114, as opposed to wirelessly connected. Housing 502 also includes a movable pad 508 in a bottom 510 of housing 502 similar to movable pad 416 of auxiliary battery unit 400 that provides an extension for pin 306 enabling tamper sensor 128 to work when base unit 101 is received in receptacle 504.

Portable security system 100 has one or more of the following features. It does not have any physical on/off switch or button accessible on the outside of base unit 101. It can be activated, deactivated, and configured or programmed only through wireless communications through cellular module 104. Management (e.g., activation, deactivation, configuration and/or messaging) is via a server that a user can communicate with via the Internet or by phone (e.g., by an interactive voice response system).

With reference to FIG. 6, the operation of portable security system 100 is generally described with reference to an asset 600 to be protected. Portable security system 100 is appropriately located, such as by placing base unit 101 on asset 600. Asset 600 may illustratively be a metal tool box and mounting magnets 208 hold base unit 101 in place on the tool box. Once portable security system 100 is activated and configured, as described below, it monitors assets 600 via sensors 108. Upon detecting an alarm condition via one of sensors 108, portable security system 100 sends an alarm message via cellular communication to server 602, which is illustratively a remotely located host system, and, if configured to do so, also sounds an audible alarm with speaker 112. Server 602 may use any or all of three types of cellular communication protocols including Cellemetry®, 1xRTT, and short message service (SMS). Cellemetry may also be used by portable security system 100 to send alarm information using the control channel. Server 602 sends the alarm message (either as a pass through or as may be formatted by server 602) to appropriate contacts that are illustratively input into server 602 for each portable security system 100 when that portable security system 100 is configured (or reconfigured) by a user. In an aspect, server 602 can call one or more phone numbers (shown illustratively by cell phone 604) input into server 602 by the user of the portable security system 100 to provide a phone notification of the alarm. Server 602 can also send an e-mail notification of the alarm to one or more e-mail address (es) input into server 602 by the user of the portable security system 100 during configuration (shown illustratively by computer system 606). Server 602 can also send the alarm message, such as via phone, e-mail or text message to the appropriate authorities (shown illustratively by police unit 608). Illustratively, server 602 also logs the alarm which can be accessed on a web page, by phone via a voice menu, and/or text via a text message menu. In an aspect, the alarm message may illustratively include a location of portable security system 100 as determined using GPS module 106. In an aspect, server 602 uses the last location of the portable security system 100, such as may have been obtained by a "locate" function and the alarm message sent by the portable security system 100 does not include location information.

As discussed, sensors 108 may include temperature sensor 124, window/door sensor 126, tamper sensor 128 and vibration sensor 130. Sensors 108 may also include other types of sensors as discussed above. In the event that controller 102 based on an input from temperature sensor 124 determines that a temperature where portable security system 100 is located is over or under temperature, controller 102 sends a temperature alarm message via cellular communication using cellular module 104 to server 602 that the temperature is out of range. In the event that controller 102 determines that a window or door has opened based on an input from window/door sensor 126, controller 102 sends an window/door open alarm message to server 602 that the window or door has been opened. Similarly, if controller 102 determines that base unit 101 has been removed from asset 600 based on an input from tamper sensor 128, it sends a tamper alarm message to server 602 that portable security 100 has been tampered with. If controller 102 determines that asset 600 is being moved such as based on an input from vibration sensor 130, controller 102 sends a vibration alarm message to server 602. If portable security system 100 includes auxiliary motion detector 500, and controller 102 determines that movement has occurred based on an input from auxiliary motion detector 500, it sends an intrusion alarm message to server 602. Controller 102 may also sound an audible alarm in each case where it sends an alarm message to server 602. It should be understood that portable security unit 100 is user configurable, via wireless programming as discussed below, to set which sensors 108 are active. Controller 602 will send alarm messages to server 602 only in response to an appropriate input from a sensor that is configured as active. Similarly, portable security unit 100 is user configurable, via wireless programming as discussed below, to set which alarm conditions will also result in controller 102 sounding an audible alarm with speaker 112. In some cases, it may be desirable that an audible alarm not be sounded upon controller detecting an alarm condition where it sends an alarm message to server 602. For example, when portable security system 100 is utilizing auxiliary motion detector 500 to monitor an area, to avoid alerting intruders that their presence has been detected, portable security system 100 may be configured so that upon detecting motion, controller 102 sends an intrusion alarm message to server 602 but does not sound an audible alarm.

In an aspect, window/door sensor 126 is a magnetic sensor, such as a hall effect transducer, disposed in housing 200, such as on printed circuit board 202 (FIGS. 2A & 2B). A magnet, shown representatively by box 214 in FIG. 2B, is then disposed on the window or door of the asset to be protected so that it is adjacent window/door sensor 126 when the window or door is closed. When the window or door is opened, the hall effect transducer senses the change in magnetic field and provides a corresponding signal to controller 102, which determines that the window or door has been opened. Controller 102 then sends an alarm message to server 602 indicating that the window or door has been opened and server 602 sends an alarm message to a user associated with the portable security system 100, such as in the manner described below.

In an aspect, window/door sensor 126 can also be used to indicate a tamper condition of an auxiliary device, described using auxiliary battery unit 400 as an example. In this example, window/door sensor 126 is a magnetic sensor, such as a hall effect transducer. Hinged cover 406 of auxiliary battery unit 400 has a magnet 409 mounted thereon. When hinged cover 406 is closed, magnet 409 is adjacent window/door sensor 126 of base unit 101, such as by being received in a recess 417 of housing base 404 of housing 402 of auxiliary battery unit 400. When hinged cover 406 is opened, window/door sensor 126 responds to the change in magnetic field and provides controller 102 of base unit 101 a signal indicative of the magnet moving away from window/door sensor 126. This causes controller 102 to determine that a tamper condition occurred, and it generates a tamper alarm. In this illustrative aspect, controller 102 determines that the tamper condition is housing cover 406 being opened and sends server 602 an tamper condition alarm message indicating that hinged cover 406 had been opened. Server 602 sends an alarm message to the contact(s) designated for that portable security system 100 indicating that the hinged cover 406 of the auxiliary battery unit had been opened.

Figure 7:
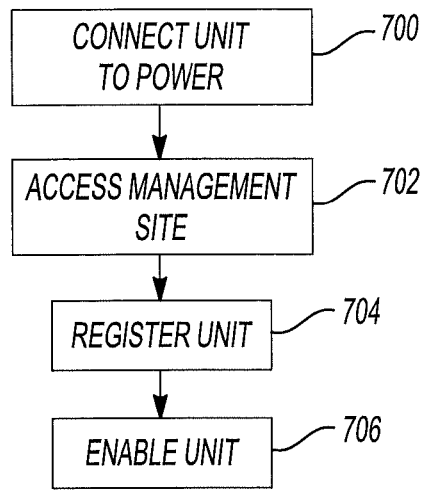
FIG. 7 is a simplified flow chart showing an enable sequence for the portable security system of FIG. 1.
Figure 10C:
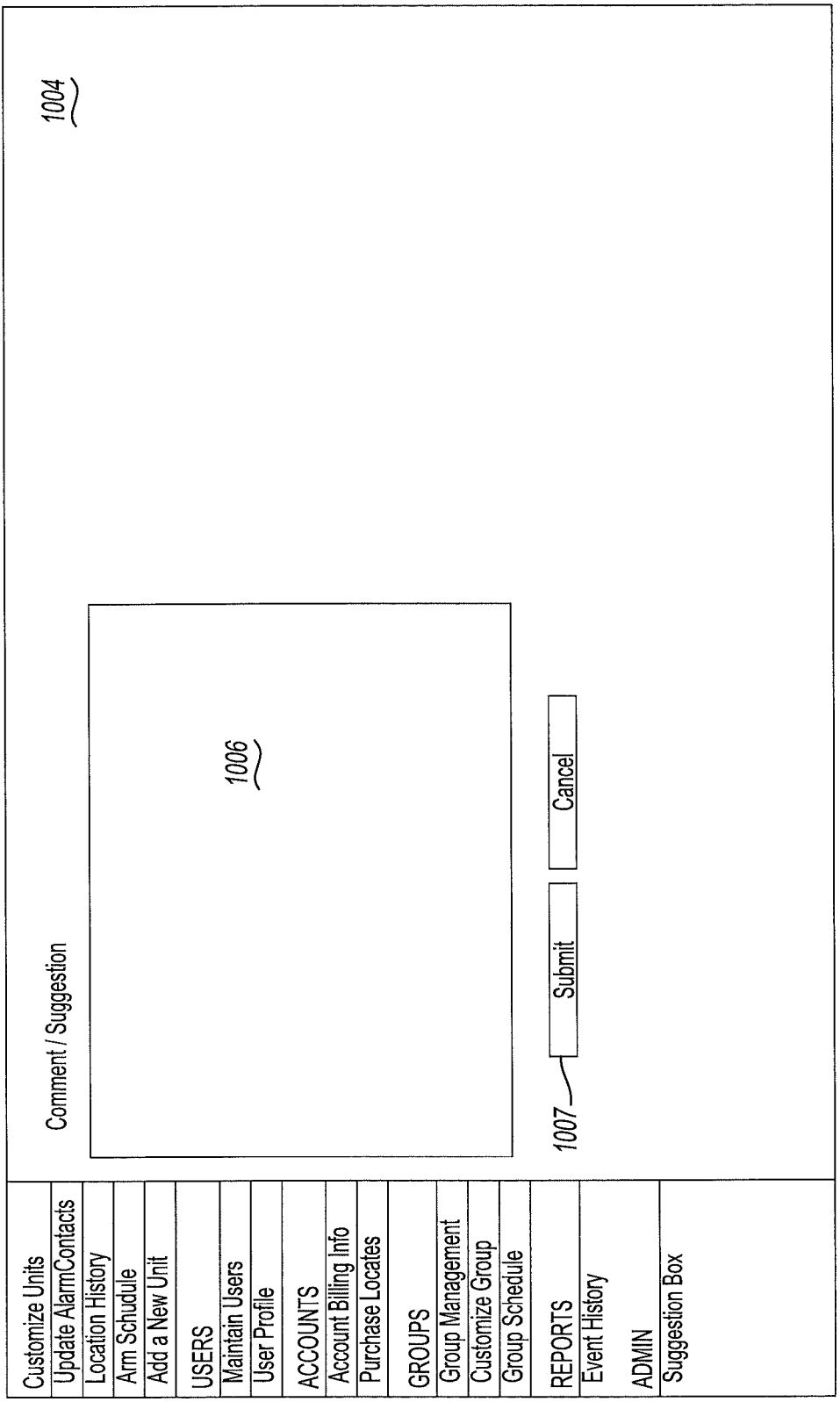
FIGS. 10A-10O are exemplar web pages of a web aspect of a management site for managing portable security systems of FIG. 1.

In an aspect, portable security system 100, after it is assembled at the factory, is provisioned with that data necessary for testing it and then tested. In an aspect, it is also provisioned prior to shipment with the parameters needed for operation. In an aspect, portable security system 100 is then shipped from the manufacturer in a disabled state with battery 110 partially charged. In an aspect, in the disabled state, battery 110 can't be charged and portable security system 100 can't send cellular messages (e.g., sending of 1×RTT messages is disabled). Portable security system 100 must then be enabled by the user. An illustrative process of enabling portable security system 100 is described with reference to FIG. 7. To do so, a user connects portable security system 100 at 700 to a source of power, such as AC charger 232 (FIG. 2A) or to auxiliary battery unit 400 (FIG. 4). This "wakes up" portable security system 100 where it can "listen" for cellular messages (e.g., receive cellular messages them) but not transmit them. At 702, the user accesses a management site 610 operated by a service provider, illustratively hosted by server 602. Illustratively, the management site 610 includes a web site, a home page 1000 for which is shown in FIG. 10A, that the user can access via the Internet where the user can manage and configure the portable security system 100. The management site 610 may also illustratively be accessible by calling a customer service number, which may illustratively connect the user to an interactive voice response system through which the user can register and configure the portable security system 100. The user then registers portable security system 100 at 704, which may illustratively require the user to enter an electronic serial number (which may be referenced as MSIN in the drawings) and the unit number (cell phone number) of the base unit 101 of the portable security system 100, which are assigned by the manufacturer or seller of portable security system 100 in much the same way that a cell phone's electronic serial number and phone number are assigned. The user also identifies the account with which portable security system 100 is associated and selects a monitoring plan for the portable security system 100. In this regard, if there is no account set-up for that portable security system 100, the user will also need to set an account up. In an aspect, this requires the user to provide a credit card number against which the fees, such as monthly fees, for that portable security system 100 are charged. In this regard, the service provider may offer a variety of monitoring plans and the user can select which monitoring plan the user wants for each portable security system 100 that the user has (e.g., self monitored, fully monitored). This process ensures that billing information for the portable security system 100 is provided by the user before portable security system 100 is enabled.

Figure 8:
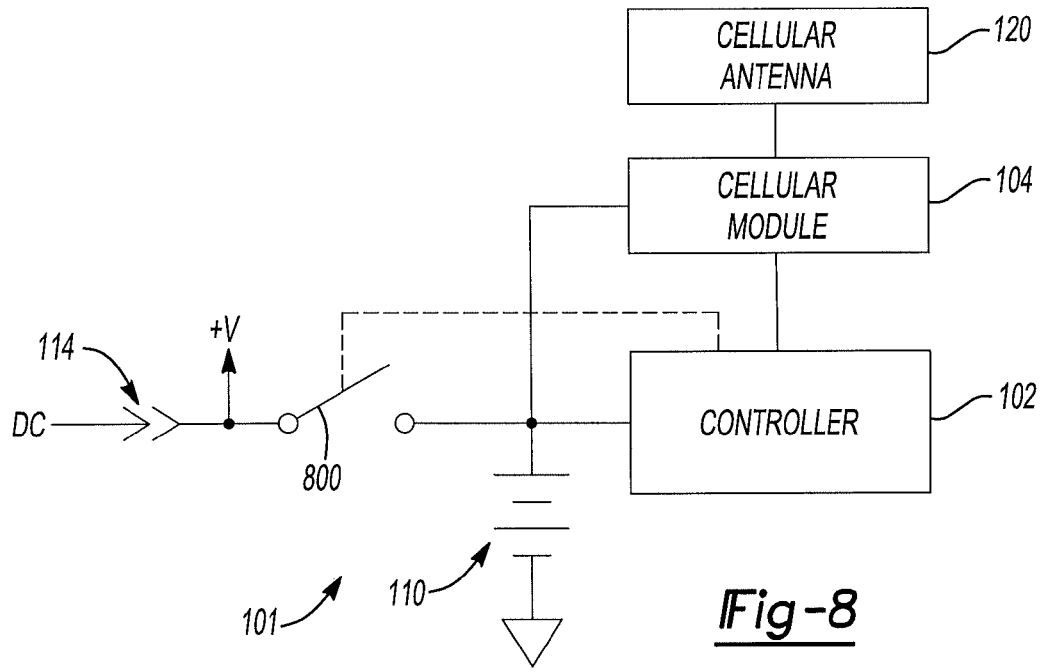
FIG. 8 is a simplified schematic of an enable/disable circuit of the portable security system of FIG. 1.

Server 602 then enables the base unit 101 of the portable security system 100 at 706. Base unit 101 of portable security system 100 is shipped from the manufacturer in a disabled state. By disabled, it is meant that battery 110 is partially charged and provides power only to those components of component of base unit 101 that are involved in switching from enabled to disabled states. As shown representatively by the simplified schematic of FIG. 8, battery 110 is connected to controller 102 and cellular module 104. Upon receipt of an enable command from server 602, provided accessory port 114 of base unit 101 is connected to a source of DC power, such as AC charger 232, controller 102 puts base unit 101 in an enable condition by closing switch 800 connecting battery 110 to accessory port 114 and to the remainder of the components of base unit 101. It should be understood that switch 800 is representative of the circuit that enables and disables base unit 101, which may include various circuit topologies as known in the art. Battery 110 is charged by the source of DC power connected to accessory port 114, such as AC charger 232.

Figure 9:
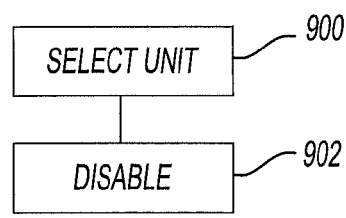
FIG. 9 is a simplified flow chart showing a disable sequence for the portable security system of FIG. 1.

With reference to FIG. 9, a user can disable base unit 101 of portable security system 100, putting it back into the same condition as when it left the manufacturer. To do so, the user accesses the management site (such as may be hosted by server 602) and at 900, selects the portable security system 100 to be disabled. Server 602 then sends a disable command at 902 to the base unit 101 of the portable security system 100 to be disabled. Upon receipt of the disable command, controller 102 opens switch 800 (FIG. 8) putting base unit 101 in the disabled state.

Management of a portable security system 100 via management site 610 is discussed with reference to the pages of the web site of management site 610. Portable security system 100 can also be managed by calling the customer service number for management site 610 and accessing it via the interactive voice response system, although some features, such as map location display, may not be suitable for phone communication and may thus be available only on the website. The user accesses a logon page (not shown) of the website management site 610 and logins which takes the user to a home page of management site 610 that is provisioned for that user, referred to herein as Units—Accounts Summary page 1000. All the portable security systems 100 associated with that user are shown on User—Accounts Summary home page 1000, along with various buttons (e.g., arm, locate, request status, settings) for selecting functions to manage the portable security systems 100 and links (shown along the left hand side of the page) that the user can select to manage portable security systems 100. Also, if these portable security systems 100 are also associated with groups, they will by shown by group. Also, the links are typically displayed along the left hand side of each of the sub pages as can be seen from FIGS. 10B-10O. In this regard, the links displayed along the left hand side of each page may vary depending on the page.

If the user wishes to enter or update the user's profile, the user selects "user profile" link under the Users heading. This takes the user to the Users—User Profile page 1002 (FIG. 10B). The user profile information that the user can enter or update on page 1002 includes the user's e-mail address, the user's phone menu login, and the user's web password. It also includes fields where the user can globally set certain display settings for the portable security systems 100 associated with the user, such as temperature scale, whether the units are identified by name or serial number, time zone, and whether the time zone follows daylight savings time.

If the user selects the "suggestion box" link under the Admin heading, the user is taken to "Comment/Suggestion" page 1004 (FIG. 10C) where the user can input suggestions or comments in text box 1006 and submit them by clicking the "submit" button 1007.

If the user selects the "customize units" link, the user is taken to the Unit Settings/Unit History page 1008 (FIG. 10D). The user selects a portable security system 100 such as by the name assigned to the portable security system, illustratively shown as "Office Trailer" in FIG. 10D in the Unit Settings segment of page 1008. Under "Sensors," the user can then select which sensors of the selected portable security system 100 are to be active and which are not by checking or unchecking the box next to each sensor. Certain sensors may include parameters that the user can also set, such as the sensitivity level and pulse count for vibration sensor 130 (FIG. 1). Also, if the sensor is of the type that can trigger an alarm on either or both a high and low reading, the user can set whether the portable security system alarms on a high reading, a low reading, or both, and the setting for the alarm. For example, temperature sensor 124 can trigger a high temperature alarm in the event of sensing temperature at or above a high temperature setting, a low temperature alarm in the event of sensing temperature at or below a low temperature reading, or both. The user can set by checking the appropriate box whether the selected portable security system 100 triggers an alarm based on a high temperature, based on a low temperature, or both. The user can also set the high temperature limit and the low temperature limit. The portable security system 100 will then respond only to those sensors that have been made active in generating alarm messages. After checking or unchecking the boxes for the various sensors and setting sensor parameters as appropriate, the user clicks the "update" button to send the updated sensor configuration to the selected portable security system 100. Upon receipt of the updated sensor configuration from server 602, controller 102 of the base unit 101 of the selected portable security system 100 updates accordingly.

Under Speaker, the user can select by checking the appropriate box whether the selected portable security system will sound an audible alarm or message using speaker 112 (FIG.

1) upon the occurrence of a particular event, such as an alarm. After doing so, the user clicks the "Update" button under Speaker to send the updated speaker configuration to the selected portable security system 100. Upon receipt of the updated configuration from server 602, the controller 102 of the base unit 101 of the selected portable security system 100 updates accordingly.

Page 1008 also displays the Unit History for the selected portable security system 100 in the "Unit History" box. This is a log of the events for the selected portable security system 100, such as alarm messages, page events, etc.

Page 1008 also displays the arm/disarm status of the selected portable security system 100, which the user can obtain by clicking "Status" button 1010. It also allows the user to arm and disarm the selected portable security system 100 by clicking the arm and disarm buttons 1012 and 1014, respectively. When the selected portable security system 100 is armed, it will, upon receiving an appropriate input from an active sensor, generate a corresponding alarm message that it sends out as discussed above. When the selected portable security system 100 is disarmed, it won't generate an alarm message or sound an audible alarm.

The "Page" button 1016 is used to turn the "Page" function on (indicated by "+" on the button) and off (indicated by (−) on the button. When the page function of the selected portable security system 100 is on, the selected portable security system 100 emits a sound from speaker 112 so that those in the vicinity of the selected portable security system 100 can locate it by the sound emanating from its speaker 112. The "Page" function can be advantageously used to locate assets, such as a particular tool, on a jobsite. The base unit 101 of a portable security system 100 is attached to the asset and when personnel on the jobsite need to locate that asset, they can turn the "Page" function for that portable security system 100 on and use the sound emanating from the speaker of that portable security system 100 to locate the asset. In an aspect, a portable security system 100 having its Page function on emits a sound from its speaker for a period of time, such as sixty seconds. In an aspect, a portable security system 100 having its Page function on emits a sound from its speaker 112 until its Page function is deactivated.

Figure 11A:
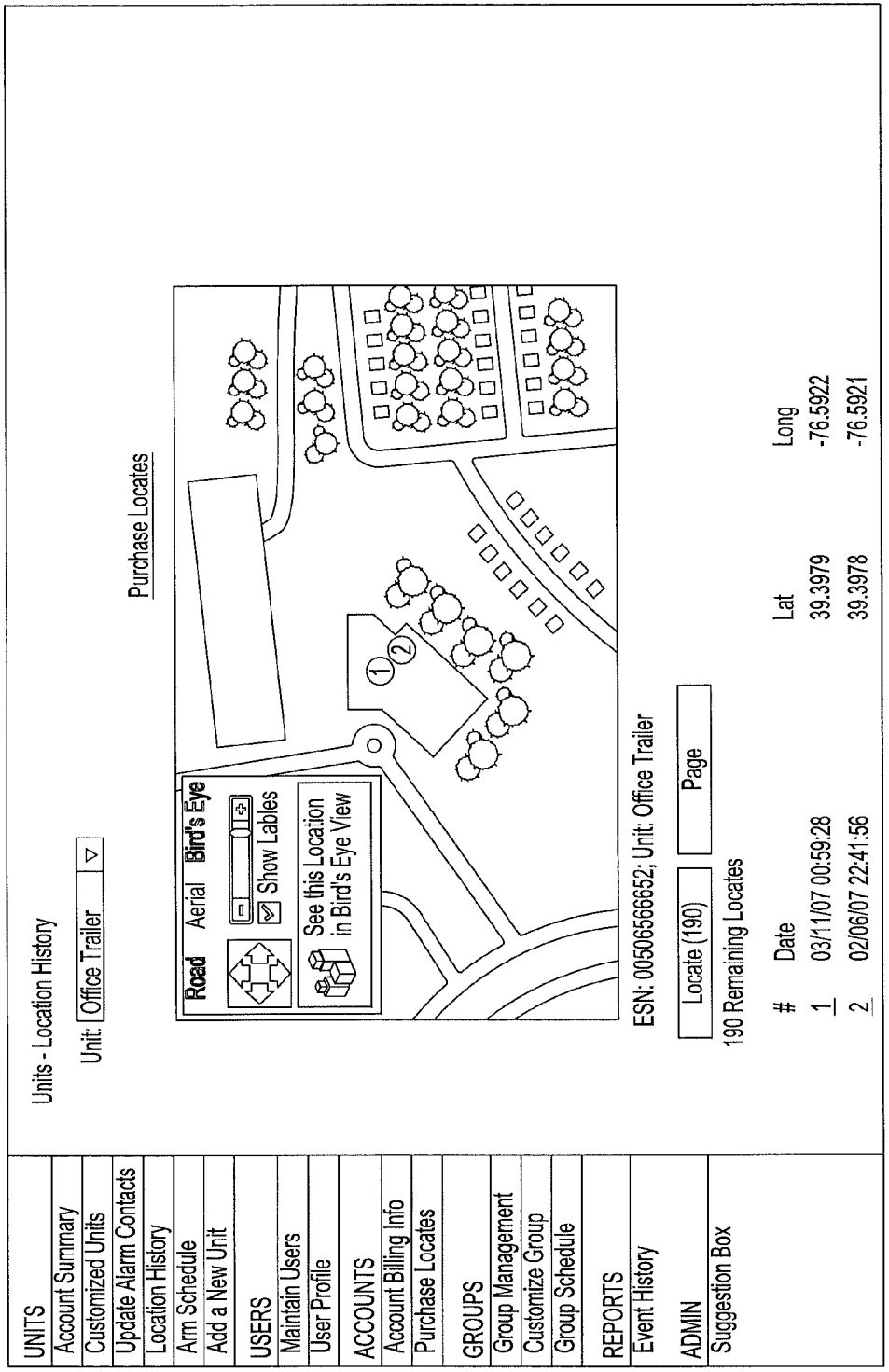
FIGS. 11A and 11B are maps showing the location (present and historical) of a portable security system of FIG. 1.
Figure 11B:
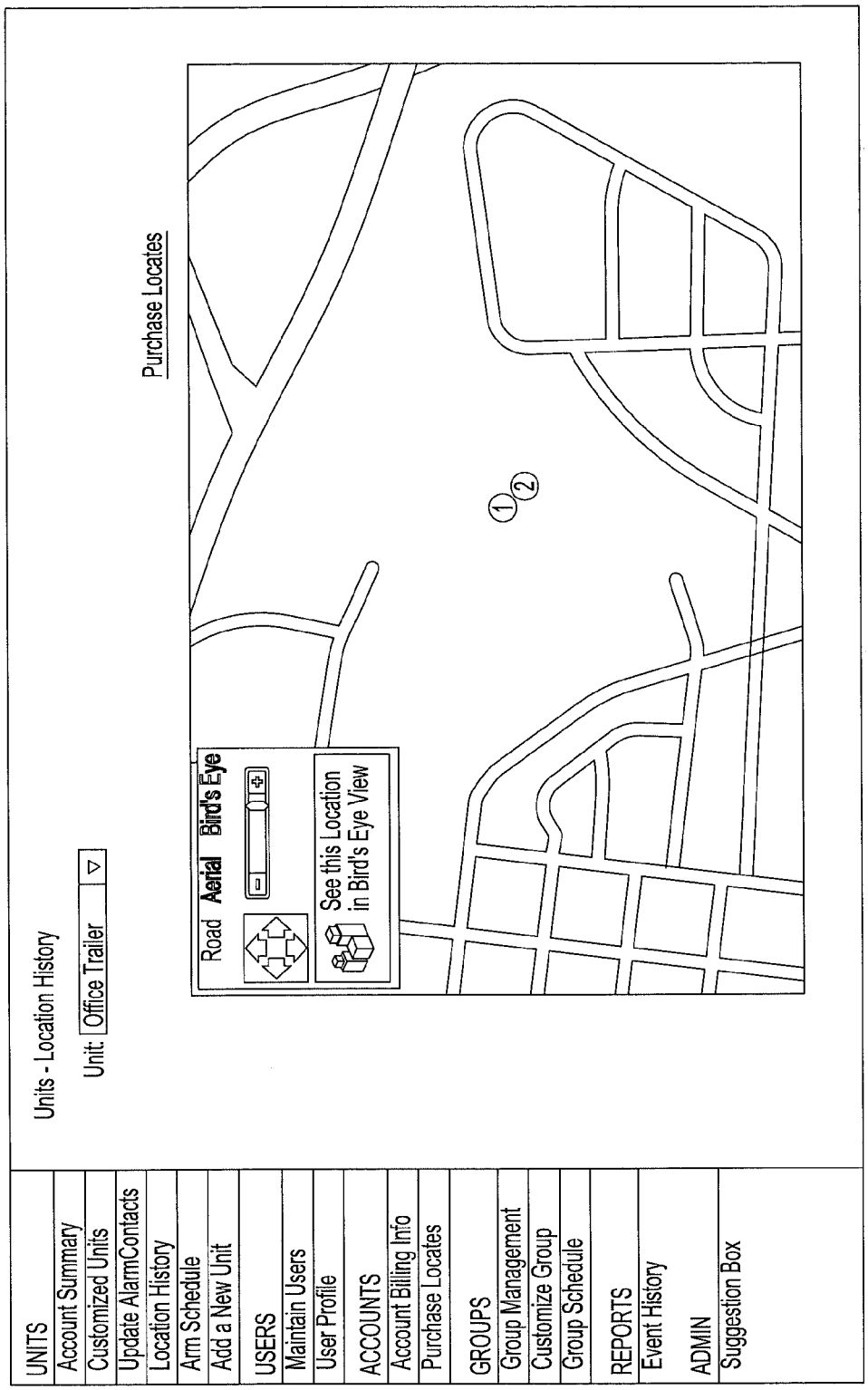

A "Locate" button (FIG. 11A) actuates the "locate" function for the for the selected portable security system 100. Clicking the "Locate" button causes server 602 to send a locate command to the selected portable security system 100. Controller 102 of the selected portable security system 100 responds to the locate command by obtaining information about its location, such as from GPS module 106. This information may illustratively be the latitude and longitude of the portable security system. The controller 102 of the selected portable security system 100 can also obtain location information from cell towers 612, which allows the controller 102 to obtain location information should its view of GPS satellites 614 be blocked, such as may be the case if base unit 101 of the portable security system 100 is in an indoor location. Controller 102 then sends the location information back to server 602 via cellular communication. Server 602 then provides the location information to the user. In this regard, server 602 may determine or obtain an address corresponding to the longitude and latitude of the portable security system 100, such as by accessing a map database. Server 602 may illustratively send the location information to the user's phone or e-mail address. Server 602 may also make the location information available to the user via phone access, such as using the IVR. It may also make the location available on the management site 610 hosted by server 602. In an aspect, server 602 maps the location information on a map, such as shown in FIGS. 11A & 11B. Test button 1019 can be clicked to test the portable security system 100.

If the user clicks the "Add a New Unit" link under the Units heading, the user is taken to Units—Add a New Unit page 1020 (FIG. 10E). The user can then add new portable security systems 100 by inputting their ESNs in the boxes.

Figure 10F:
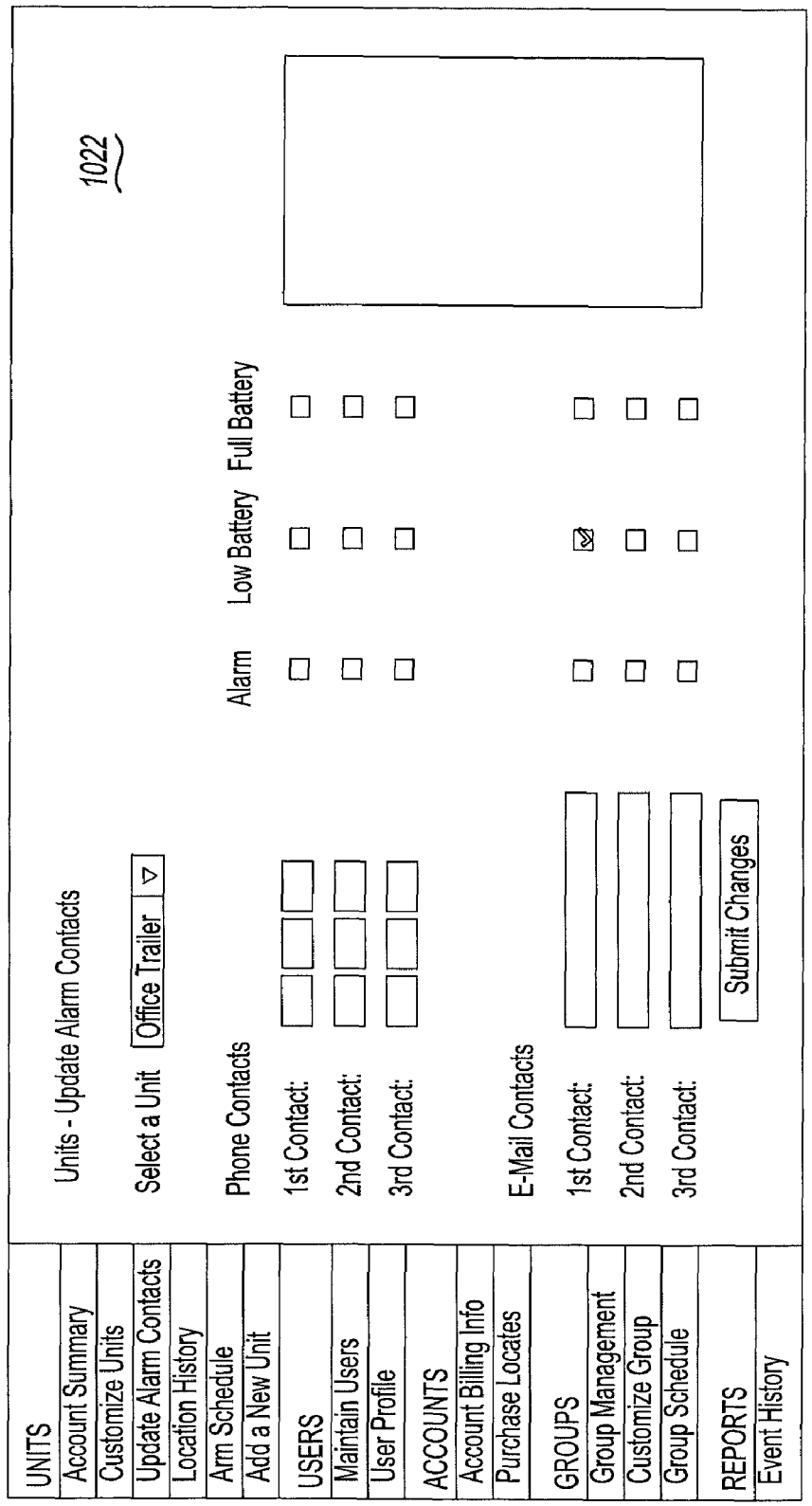

Clicking the "Update Alarm Contacts" link takes the user to "Units—Update Alarm Contacts" page 1022 (FIG. 10F). Page 1022 is used to designate the contact information for the selected portable security system 100 where messages, such as alarm messages, are to be sent. In the illustrative embodiment shown in FIG. 10F, up to three e-mail addresses for contacts for e-mail messages can be designated and up to three phone numbers for contacts for phone message, such as alarm messages, can be designated. Each e-mail and phone number contact field has associated with it boxes that are checked or unchecked to indicate when an e-mail message is sent to the e-mail address or a phone call made to the phone number. In the embodiment shown in FIG. 10F, if the "alarm" box is checked, then server 602 sends an alarm e-mail message or phone call is made in the event when the portable security system 100 generates an alarm message. If the "low battery" box is checked, then server 602 sends a low battery message or phone call is made in the event portable security system 100 generates a low battery message. If the "full battery" box is checked, then server 602 sends a full battery e-mail message or phone call is made in the event portable security system 100 generates a full battery message. In an illustrative aspect, server 602 tries to call the first designated phone number and if unsuccessful, then tries the next designated phone number. In a variation, server 602 tries to call all the designated phone numbers. In a variation, server 602 sends an e-mail message to all the designated e-mails.

In this regard, in an aspect, the contact information includes prioritization information and server 602 sends a notification message to one or more of the contacts based on the prioritization information. In an aspect, server 602 sends the notification messages to the contacts based on priority order with server 602 sending the notification message to the next lower priority contact only if server 602 receives no response from the contact to which it sent the notification message.

In an aspect, the alarm message is one of a plurality of different types of alarm messages and the contact information set in server 602 includes contact information for a plurality of contacts for server 602 to contact upon receipt of the alarm message wherein different contacts are associated with different ones of the different types of alarm messages. Server 602 sends a notification message upon receipt of the alarm message to the contact associated with the type of alarm message that corresponds to the received alarm message.

With reference to FIG. 10G, the name unit page 1024 take provides for changing the name of a selected portable security system 100. Name unit page 1024 is accessed via selecting a unit on page the Units Settings/Unit History page 1008 (FIG. 10D).

Clicking the "Arm Schedule" link takes the user to Arm/Disarm schedule page 1026 (FIG. 10H). In the illustrative embodiment shown in FIG. 10H, a user can select a portable security system 100 and set a schedule (by days of the week or daily) of the time(s) of day when the selected portable security system 100 is armed and when it is disarmed. After setting the schedule, clicking the "Update" button causes server 602 to send the schedule to the selected portable security system 100. Upon receipt of the schedule, the controller 102 of the selected portable security system 100 sets the arm/disarm schedule accordingly and arms and disarms the portable security system 100 according to the schedule.

Clicking the "Maintain Users" link takes the user to Add/Update Users page 1027 (FIG. 10I). The user can then add a new user or update information for a user. Depending on the privileges that the user has, the user can add a new user or update information for a user. For example, a user having administrative privileges for an account can add a user for that account or change information about the users for that account. A user not having administrative privileges for an account would be able to change only the information for that particular user.

In aspect, management site 610 provides for multiple levels of authority. That is, personnel who have access to management site 610 are provided various levels of authority with regard to which functions of management site 610 that they can access or use. In an aspect, levels of authority include customer service support which provides customer support personnel of the provider that manages management site 610 access to all accounts for troubleshooting, and a "super user" that provides rights in addition to those provided customer service support personnel. For end users, e.g., users associated with portable security systems 100, three levels of authority are provided in an aspect. These are "Account Owner," "Master User," and "User."

In an aspect, there is one Account Owner per account and the Account Owner has access to all functions for the portable security systems 100 associated with that account as well as functions associated with the account. The Account Owner sets up the account, manages the payments for the account, and has authority to set up Master Users and Users.

In an aspect, there can be an unlimited number of Master Users for each account. A Master User has access to all functions for the portable security systems 100 associated with the account. A Master User can purchase locates for the account using his/her credit card, such as by clicking the "Purchase Locates" link. A Master User can set up other Master Users and Users.

In an aspect, there can be an unlimited number of Users for each account. In an aspect, a User has access only to the arm and disarm functions for the portable security systems 100 associated with the account. It should be understood that the lower case term "user" is used herein to refer to an person having access to management site 610 regardless of the level of authority assigned to that person while the capitalized term "User" is used herein to refer to a user of management site 610 assigned the "User" level of authority.

The "Accounts" link and sublinks thereunder take a user to pages used to set up and manage accounts. Again, the access to these pages and functions available thereon depends on the level of authority assigned to the user.

Clicking the Account Maintenance link 1029 on Account Selection Page 1030 (FIG. 10k) takes the user to Account page 1028 (FIG. 10J), where the user can assign a name to an account. This again requires that the user have the appropriate privileges.

Figure 10K:
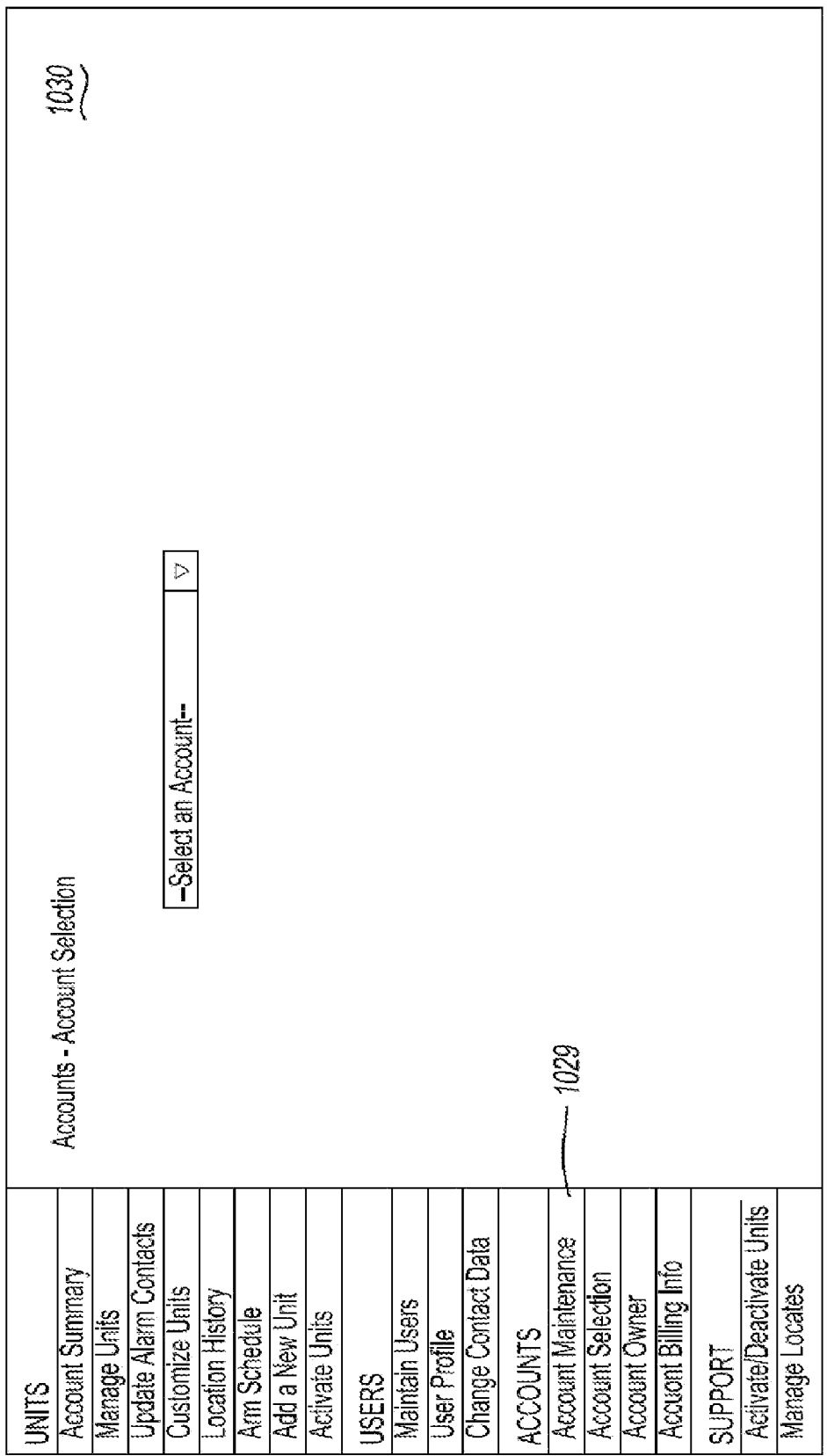

Clicking the "Account Selection" link on home page 1000 takes the user to Account Selection page 1030 (FIG. 10K). In an aspect, access to this page is restricted to users who have customer service support authority or "super user" authority. This page allows the user to select an account for which information pertain to the account is then displayer to allow the user to troubleshoot any problems associated with the account or the like.

In addition to managing portable security systems 100 individually by selecting each portable security system 100, portable security systems 100 assigned to an account can be managed by groups. That is, individual portable security systems 100 can be assigned to a group and that portable security systems 100 assigned to that group managed collectively. For example, a group may be set up for all portable security systems 100 that are at single location, with a different group being set up for different locations. The different locations may, for example, be different jobsites with one group being for one jobsite and a second group being for a different jobsite. A group can also be created so that all of the features for the portable security systems 100 in the group can be set at the same time. In an aspect, the features available for groping are arm, disarm, create schedule, change sensor settings and change speaker settings.

Figure 10L:
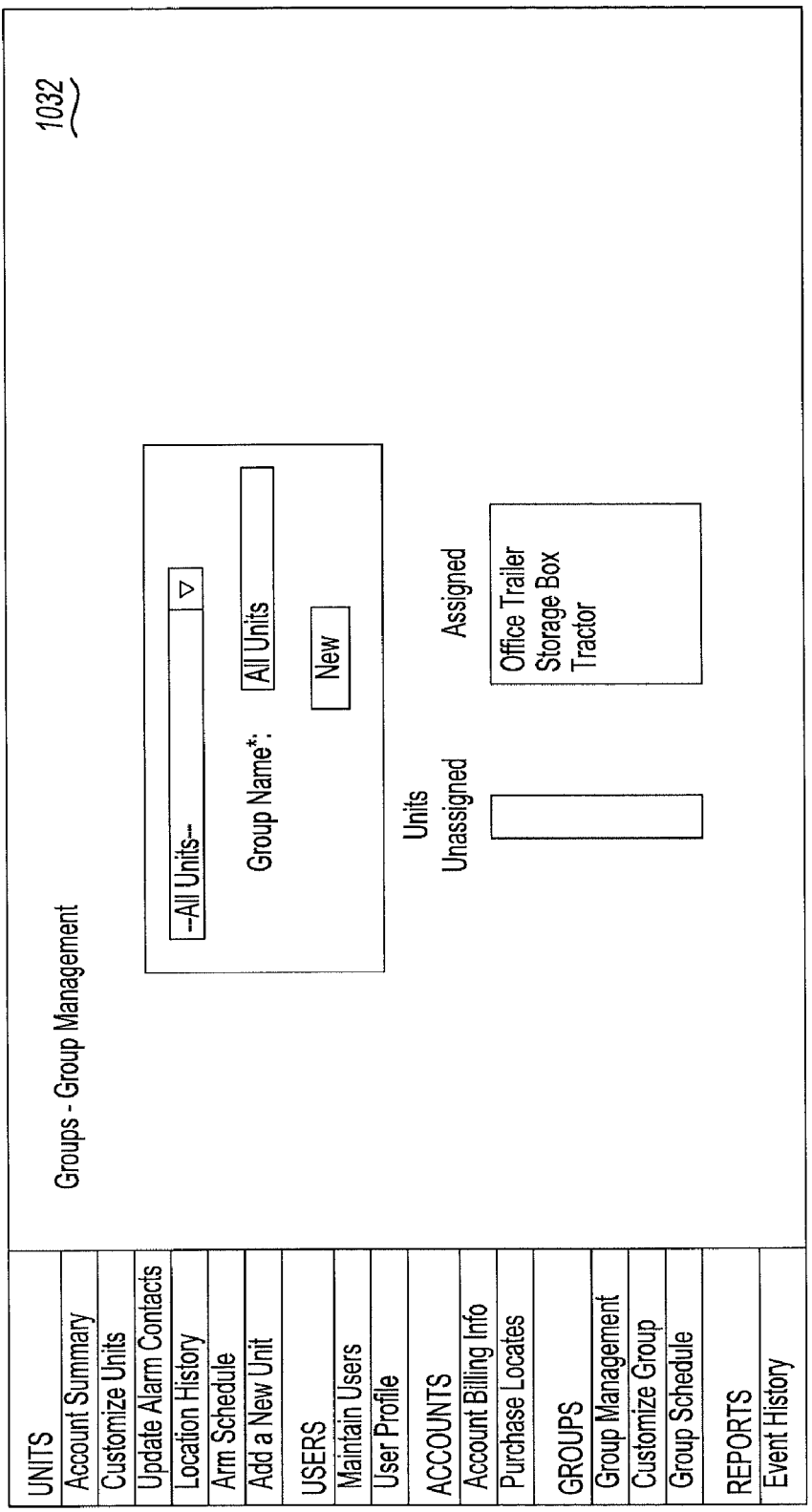

Clicking the "Group Management" link takes the user to "Group" page 1032 (FIG. 10L). The user can select or add a group, specify the group name and, if applicable, IVR tag name, and assign the portable security systems 100 associated with the account to the group. In this regard, Group page 1032 may, in an aspect, list all the portable security systems 100 associated with a user either as being assigned to the selected group (listing them in the "Assigned" column) or not assigned to it (listing them in the "unassigned" column). The user can then by using arrows move the portable security systems 100 between the Assigned and Unassigned columns to assign them to the selected group or remove them from the selected group.

Clicking the "Customize Group" link takes the user to the "Customize Group" page 1038 (FIG. 10M). This page is similar to the Unit Settings/Unit History page 1008 (FIG. 10D) except that it pertains to all the portable security systems 100 assigned to the selected group as opposed to an individual portable security system 100. The user selects which sensors are to be active and sets the sensor parameters as appropriate. After doing so, the user clicks update and server 602 then sends these configuration settings to each portable security system 100 assigned to the selected group. The user can also select the speaker settings. The controllers 102 for each of these portable security systems 100 then update the configurations of the portable security systems 100 accordingly. The user can also arm and disarm the portable security systems 100 assigned to the selected group by clicking the Arm and Disarm buttons.

Clicking the "Group Schedule" link (FIG. 10A) takes the user to a group arm/disarm schedule page 1040 (FIG. 10N). Group arm/disarm schedule page 1040 is similar to arm/disarm schedule page 1026 (FIG. 10H) except that it applies to all the portable security systems 100 assigned to the selected group as opposed to an individual portable security system 100. The user sets a schedule (by days of the week or daily) of time(s) of day when the group is to be armed and disarmed. After setting the schedule, clicking the "Update" button causes server 602 to send the schedule to the portable security systems 100 assigned to the selected group. Upon receipt of the schedule, the controllers 102 for the portable security systems 100 assigned to the selected group set the arm/disarm schedule for their respective portable security system 100 accordingly and arm and disarms their respective portable security system 100 according to the schedule.

Clicking the "Event History" button under Reports takes the user to a report page 1042 (FIG. 10O). After selecting a portable security system 100 (or group) from the pick list, the user enters the parameters for the report in the appropriate fields and clicks the "search" button. A report of the events for the selected portable security system 100 (or group) within the selected parameters is then displayed, similar to Unit History report shown on FIG. 10D.

The base unit 101 of a portable security system 100 can advantageously be used to monitor the temperature in the area around the base unit and when the temperature is out of range, cause a user to be alerted, such as by server 602 calling a number assigned by the user or sending an e-mail to an e-mail address assigned by the user, such as has been described above with reference to the contacts for unit page 1022 (FIG. 10F). The user sets the temperature thresholds (High, Low, or both) such as described above with reference to Unit Status—Customize page 1008 (FIG. 10D). When the temperature exceeds the High temperature limit or drops below the Low temperature limit (as applicable), controller 102 of the base unit 101 sends out an alarm message to server 602 that the temperature is above or below, as applicable, the High or Low temperature limit and server 602 notifies the user associated with the portable security system 100 as described above. The base unit 101 of a portable security system 100 can thus be used in monitoring temperature such as where concrete is curing so that if the temperature goes out of a range, the associated user is timely notified so that the user can timely take appropriate action to resolve the problem.

Assuming a successful location function has been performed, clicking the Location History link takes the user to a page displaying a map, such a satellite image map as shown in FIG. 11A or a street map as shown in FIG. 11B, of the geographic area in which the portable security system 100 is located with an indication on the map where the portable security system 100 is located. The latitude, longitude and address of the location of the selected portable security system 100 are also displayed along with the date. History location may also be displayed, as shown in the illustrative embodiment shown in FIG. 11A.

Figure 12:
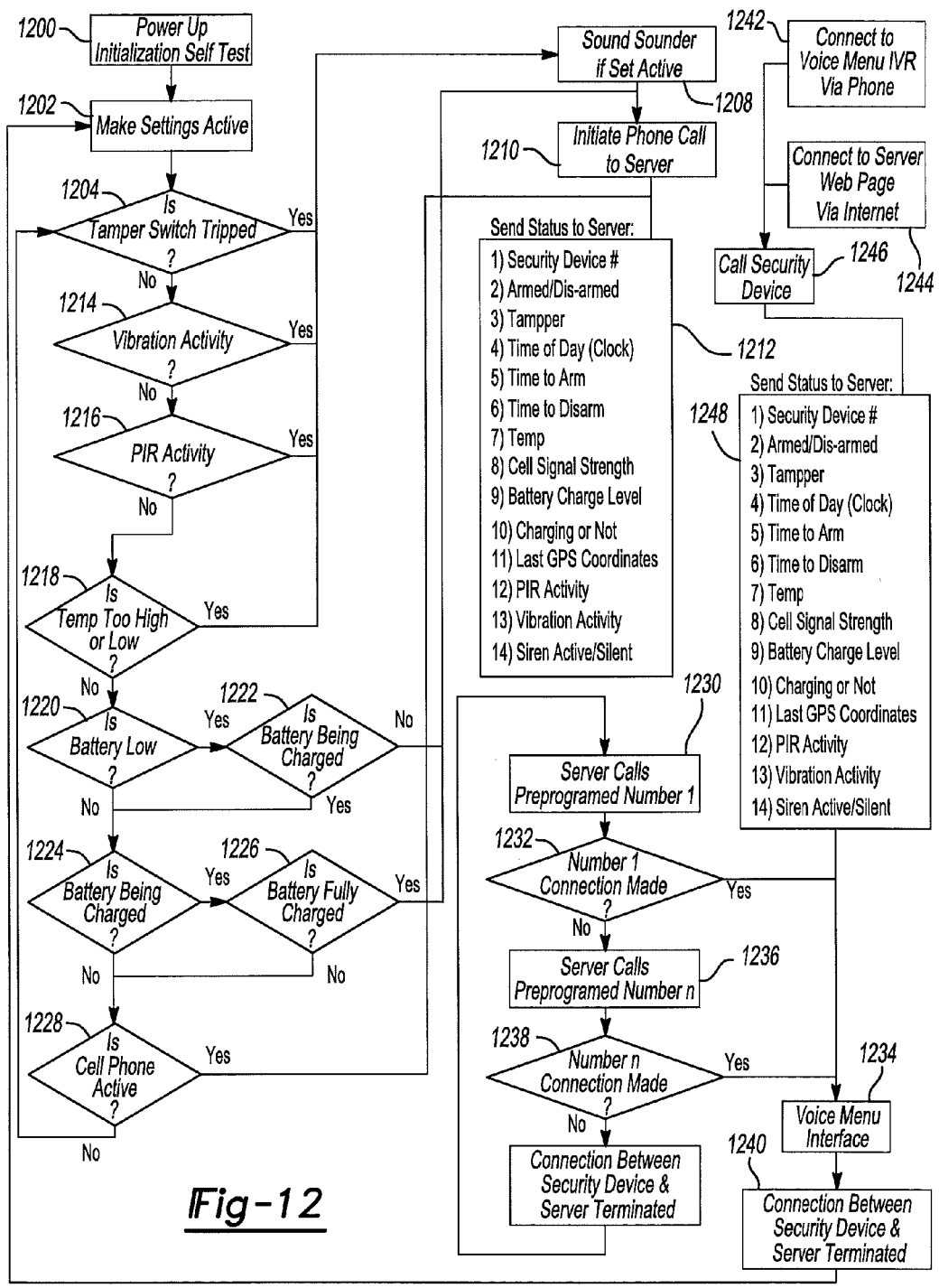
FIG. 12 is a flow chart of an illustrative routine for operation of the asset monitoring system of FIG. 6.

With reference to FIGS. 6 and 12, an illustrative routine for the operation of an asset monitoring system 616 having portable security system 100 and server 602 is described. It should be understood that while the operation of asset monitoring system 616 is described with reference to one portable security system 100 and associated user, it should be understood that asset monitoring system 616 provides for multiple users and multiple portable security systems 100 for each user, as discussed above with reference to FIGS. 10A-10O.

At 1200, portable security system 100 is powered up and goes through an initialization self-check. At 1202, the settings of portable security system 100 such as sent by server 602 are made active and in an illustrative aspect, speaker 112 chirps to signify that portable security system 100 is armed. At 1204, a check is made whether tamper sensor 128 has been tripped. If so, and if the configuration setting for a tamper condition was set to sound an audible alarm, an audible tamper alarm is sounded at 1208 using speaker 112 and a call initiated to server 602 at 1210 and status information sent to server 602 at 1212. It should be understood that the audible alarm can be a unique sound for each type of alarm. The status information can include one or more of the following:

If tamper sensor 128 is not tripped, a check is made at 1214 whether vibration sensor 130 has detected any vibration activity. If so, the routine proceeds to 1208 as discussed above.

If no vibration activity was detected, a check is made at 1216 whether auxiliary motion sensor 500 (if being used) has detected motion. If so, the routine proceeds to 1208.

If no motion was detected, a check is made at 1218 whether the temperature as sensed by temperature sensor 124 is too high or too low (as applicable based on the configuration settings sent by server 602). If so, the routine proceeds to 1208.

If the temperature was not too high or too low, a check is made at 1220 whether battery 110 is low. If so, a check is made at 1222 whether battery 110 is being charged and if not, the routine branches to 1210.

If battery 110 was not low, a check is made at 1224 whether the battery is being charged. If so, a check is made at 1226 whether the battery is fully charged and if so, the routine branches to 1210. If the battery 110 is not being charged, or is not fully charged, a check is then made at 1228 to see if cellular module 104 is active. If not the routine branches to 1204. If cellular module 104 is active, the routine branches to 1212.

After status information is sent to server 602 at 1212 and server 602 receives it, server 602 sends alarm messages to the contacts set up for that portable security system 100 as discussed above. In the illustrative operation shown in FIG. 12, server 602 calls at 1230 the first phone number for the user associated with the portable security system 100 as set up during configuration of the contacts for that portable security system 100. If a connection is found to be successful at 1232, the routine branches to 1234 where the user answering the call is connected to the interactive voice response system. If no connection is made, the server tries each programmed number in turn, as representatively shown at 1236 and if a connection is found to be successful at 1238, the routine branches to 1234 as discussed above. If no connection is successful, the routine branches to 1230 and starts again with the first programmed number.

Once a user completes interacting with server, the connection between the portable security system 100 and server 602 is terminated at 1240 and the routine branches back to 1202.

A user can request a status report from the portable security system 100 by accessing server 602 by phone at 1242 and being connected to the interactive voice response system, or by accessing management site 610 via the Internet at 1244. Server 602 establishes cellular communication with the portable security system 100 at 1246 and commands a status report from a selected portable security system 100, which the selected portable security system 100 sends to server 602 at 1248. The routine then branches to 1234 as discussed above.

The invention claimed is:

1. A portable security system, comprising:
a base unit having a housing in which a controller, a wireless transmitter, a window/door sensor and a tamper sensor are disposed;
an auxiliary unit in which the base unit is removably received;
the window/door sensor responsive to a first actuator mounted on a window or door for sensing movement of the window or door and providing a window/door open signal to the controller upon sensing movement of the first actuator, the window/door sensor responsive to movement of a second actuator mounted on the auxiliary unit when the base unit is received in the auxiliary unit and generating a first tamper signal in response to movement of the second actuator that is provided to the controller;
the tamper sensor, when the base unit has been mounted to an asset, sensing if the base unit is displaced away from the asset and generating a second tamper signal in response to sensing that the base unit is displaced from the asset that is provided to the controller;
the auxiliary unit including a tamper sensor actuator, the tamper sensor actuator, when the base unit is received in the auxiliary unit and the auxiliary unit has been mounted to the asset, actuating the tamper sensor when the auxiliary unit is displaced from the asset so that the tamper sensor generates the second tamper signal.

2. The portable security system of claim 1 wherein the tamper sensor includes a plunger that, when the base unit is mounted on an asset, is moved to a depressed position in the housing and is urged out from the depressed position when the base unit is displaced from the asset, and a position sensor that senses whether the plunger is in the depressed position.

3. The apparatus portable security system of claim 2 wherein the tamper sensor actuator of the auxiliary unit includes a moveable element that contacts the plunger of the tamper sensor.

4. The portable security system of claim 1 wherein the tamper sensor includes a magnetic sensor and a plunger assembly that includes a plunger, a spring that urges the plunger outwardly from the depressed position, and a magnet on a proximal end of the plunger, the magnetic sensor disposed in the housing of the base unit, the magnetic sensor sensing when the magnet changes location with respect to the magnetic sensor when the plunger moves outwardly from the depressed position when the base unit is displaced from the asset and generating the second tamper signal in response thereto.

5. The portable security system of claim 4 wherein the window/door sensor includes a magnetic sensor and the actuator mounted on the auxiliary unit is a magnet.

6. The portable security system of claim 1 wherein the auxiliary unit includes a hinged cover on which the actuator is mounted, the hinged cover closed when the base unit is received in the auxiliary unit and the window/door sensor responsive to the actuator moving with respect to the window/door sensor when the hinged cover is opened and generating the first tamper signal in response to the hinged cover being opened.

7. The portable security system of claim wherein
when the base unit is mounted on the asset and the controller receives the window/door opening signal from the window/door sensor the controller generates an alarm message that the window or door has moved which alarm message is sent wirelessly wireless transmitter/receiver, and
wherein when the base unit is received in the auxiliary unit and the controller receives the first tamper signal from the window/door sensor the controller generates a tamper message that the base unit is being removed from the auxiliary unit which tamper message is sent wirelessly by the wireless transmitter/receiver.

8. The portable security system of claim 7 wherein when the controller receives the second tamper signal the controller generates a second tamper message that the portable security system is being removed from the asset which second tamper message is sent wirelessly by the wirelessly transmitter.

9. The portable security system of claim 8 further including a global positioning system module ("GPS module") disposed in the housing and coupled to the controller, the controller obtaining from the GPS module location information of where the portable security system is located, which location information is sent wirelessly by the wireless transmitter with each alarm or tamper message.

10. The portable security system of claim 7 further including a global positioning system module ("GPS module") disposed in the housing and coupled to the controller, the controller obtaining from the GPS module location information of where the portable security system is located, which location information is sent wirelessly by the wireless transmitter with each alarm or tamper message.

11. The portable security system of claim 1 wherein the auxiliary unit is a passive infrared motion detector.

12. The portable security system of claim 1 wherein the auxiliary unit includes at least one battery cell.

13. The portable security system of claim 1 including a temperature sensor coupled to the controller.

14. A portable security system, comprising:
   a base unit having a housing in which a controller, a wireless transmitter and a tamper sensor are disposed;
   an auxiliary unit in which the base unit can be received;
   the tamper sensor sensing if the base unit is displaced away from the asset when the base unit has been mounted to the asset and generating a second tamper signal that is provided to the controller in response to sensing that the base unit is displaced from the asset;
   the auxiliary unit including a tamper sensor actuator, the tamper sensor actuator, when the base unit is received in the auxiliary unit and the auxiliary unit has been mounted to the asset, actuating the tamper sensor when the auxiliary unit is displaced from the asset so that the tamper sensor generates the second tamper signal.

15. The portable security system of claim 14 wherein the tamper sensor includes a plunger that is moved to a depressed position in the housing when the base unit is mounted on an asset and is urged out from the depressed position when the base unit is displaced from the asset, and a position sensor that senses whether the plunger is in the depressed position.

16. The portable security system of claim 15 wherein the tamper sensor actuator of the auxiliary unit includes a moveable element that contacts the plunger of the tamper sensor.

17. The portable security system of claim 14 wherein the tamper sensor includes a magnetic sensor and a plunger assembly that includes a plunger, a spring that urges the plunger outwardly from the depressed position, and a magnet on a proximal end of the plunger, the magnetic sensor disposed in the housing of the base unit, the magnetic sensor sensing when the magnet changes location with respect to the magnetic sensor when the plunger moves outwardly from the depressed position when the base unit is displaced from the asset and generating the second tamper signal in response thereto.

18. The portable security system of claim 14 further comprises a window/door sensor residing in the base unit, the window/door sensor responsive to a first actuator mounted on a window or door for sensing movement of the window or door and providing a window/door open signal to the controller upon sensing movement of the first actuator, the window/door sensor responsive to movement of a second actuator mounted on the auxiliary unit when the base unit is received in the auxiliary unit and generating a first tamper signal in response to movement of the second actuator that is provided to the controller.

19. The portable security system of claim 18 wherein the auxiliary unit includes a hinged cover on which the actuator is mounted, the hinged cover closed when the base unit is received in the auxiliary unit and the window/door sensor responsive to the actuator moving with respect to the window/door sensor when the hinged cover is opened and generating the first tamper signal in response to the hinged cover being opened.

20. The portable security system of claim 18 wherein
   when the base unit is mounted on the asset and the controller receives the window/door opening signal from the window/door sensor the controller generates an alarm message that the window or door has moved which alarm message is sent wirelessly wireless transmitter/receiver, and
   wherein when the base unit is received in the auxiliary unit and the controller receives the first tamper signal from the window/door sensor the controller generates a tamper message that the base unit is being removed from the auxiliary unit which tamper message is sent wirelessly by the wireless transmitter/receiver.

21. The portable security system of claim 20 wherein when the controller receives the second tamper signal the controller generates a second tamper message that the portable security system is being removed from the asset which second tamper message is sent wirelessly by the wirelessly transmitter.

22. The portable security system of claim 21 further including a global positioning system module ("GPS module") disposed in the housing and coupled to the controller, the controller obtaining from the GPS module location information of where the portable security system is located, which location information is sent wirelessly by the wireless transmitter with each alarm or tamper message.

23. The portable security system of claim 20 further including a global positioning system module ("GPS module") disposed in the housing and coupled to the controller, the controller obtaining from the GPS module location information of where the portable security system is located, which location information is sent wirelessly by the wireless transmitter with each alarm or tamper message.

24. The portable security system of claim 14 wherein the auxiliary unit is a passive infrared motion detector.

25. The portable security system of claim 14 wherein the auxiliary unit includes at least one battery cell.

26. The portable security system of claim 14 including a temperature sensor coupled to the controller.

* * * * *